US011805787B2

(12) United States Patent
Arvik et al.

(10) Patent No.: US 11,805,787 B2
(45) Date of Patent: Nov. 7, 2023

(54) FOOD COMPOSITIONS INCORPORATING AGRICULTURAL MARC, AND METHODS OF PRODUCING THEREOF

(71) Applicant: Sonomaceuticals, LLC, Santa Rosa, CA (US)

(72) Inventors: Torey Arvik, Vallejo, CA (US); Ralph Jerome, New Hope, PA (US)

(73) Assignee: Sonomaceuticals, LLC, Santa Rosa, CA (US)

( * ) Notice: Subject to any disclaimer, the term of this patent is extended or adjusted under 35 U.S.C. 154(b) by 0 days.

(21) Appl. No.: 17/503,179

(22) Filed: Oct. 15, 2021

(65) Prior Publication Data

US 2022/0117254 A1 Apr. 21, 2022

Related U.S. Application Data

(60) Provisional application No. 63/092,976, filed on Oct. 16, 2020.

(51) Int. Cl.
*A23G 1/48* (2006.01)

(52) U.S. Cl.
CPC ............ *A23G 1/48* (2013.01); *A23G 2200/14* (2013.01)

(58) Field of Classification Search
None
See application file for complete search history.

(56) References Cited

U.S. PATENT DOCUMENTS

| | | |
|---|---|---|
| 10,105,409 B2 | 10/2018 | Arvik et al. |
| 10,130,671 B2 | 11/2018 | Arvik et al. |
| 10,744,177 B2 | 8/2020 | Arvik |
| 10,772,924 B2 | 9/2020 | Arvik et al. |
| 10,894,073 B2 | 1/2021 | Arvik et al. |
| 2018/0289048 A1 | 10/2018 | Unlu et al. |
| 2019/0183155 A1* | 6/2019 | Manchuliantsau .. A21D 17/008 |
| 2019/0223476 A1 | 7/2019 | Manchuliantsau et al. |

FOREIGN PATENT DOCUMENTS

| | | | |
|---|---|---|---|
| CN | 107006572 A | 8/2017 | |
| DE | 202012010359 U1 | 2/2013 | |
| KR | 101175050 B1 | 8/2012 | |
| RU | 2166256 C2 | 5/2001 | |
| WO | WO-8502757 A * | 7/1985 | ............... A23G 1/48 |
| WO | WO-9945797 A1 * | 9/1999 | ............... A23G 1/30 |
| WO | 2005058476 A1 | 6/2005 | |
| WO | 2019053671 A1 | 3/2019 | |
| WO | 2019199505 A1 | 10/2019 | |
| WO | 2020028446 A1 | 2/2020 | |

OTHER PUBLICATIONS

Decorde et al; Chardonnay grape see proanthocyanidin extract; Mol. Nutr Food Res 2009 %3, 659-666 (Year: 2009).*
Lees and Jackson, Sugar confectionery and chocolate manufacture; Leonard hill Books, 1973 Edition; chapter 8 pp. 119 to 127. (Year: 1973).*
Acan, B.G et al. (Mar. 2021). "Effect of Grape Pomace Usage in Chocolate Spread Formulation on Textural, Rheological and Digestibility Properties," LWT 110451 138: 1-9.
Amany, E. M. et al. (Dec. 2010). "Utilization of Carrot Pomace in Formulating Functional Biscuits and Cakes," Alex. J. Fd. Sci. & Technol. 7(2): 25-32.
Baker, B.S. et al. (Nov. 21, 2006). "Measurement of Yield Stress in Dark Chocolate Using Controlled Stress Vane Method," Journal of Texture Studies 37 : 655-667.
Bolenz, S. et al. (2021). "Technological and Nutritional Aspects of Milk Chocolate Enriched With Grape Pomace Products," European Food Research and Technology 247: 623-636.
Bussy, U. et al. (Sep. 26, 2020). "Single Laboratory Validation for the Determination of Cocoa Flavanols and Procyanidins (by Degree ofPolymerization DP1-7) in Cocoa-Based Products by Hydrophilic Interaction Chromatography Coupled with Fluorescence Detection: First Action May 2005," Journal of AOAC International 104(2): 413-421.
Ciftci, O.N. et al. (2009). "Effect of the Addition of a Cocoa Butter-Like Fat Enzymatically Produced From Olive Pomace Oil on the Oxidative Stability of Cocoa Butter," Journal of Food Science 74(4): E184-E190.
Connery, T. (Aug. 8, 2018). "The Amazing Cocoa Butter—6 Reasons to Make It Part of Your Health & Beauty Regimen!" Retrieved from Internet: URI: https ://wildmountainchocolate.com/blogs/news/the-amazing-cocoa-butter-make-It-part-ofyour-health-beauty-regimen, entire document, especially pp. 2 and 6.
Dein, M. et al. (2021) "Characterization of Odorants in Chardonnay Marc Skins," Journal of Agricultural and Food Chemistry 69(41):12262-12269.
García-Lomillo, J. et al. (Jan. 2017). "Applications of Wine Pomace in the Food Industry: Approaches and Functions," Comprehensive Reviews in Food Science and Food Safety 16(1): 3-22.
Hwang, M.H, et al. (Aug. 2012). "Quality Characteristics and Antioxidant Activities of Chocolate Added With Mulberry Pomace," Korean Journal of Food and Cookery Science 28(4): 479-487.
International Search Report dated Jan. 28, 2022 for International Patent Application No. PCT/US21/55309.
Ji, M. et al. (Oct. 2, 2015). "Rapid Separation and Identification of Phenolics in Crude Red Grape Skin Extracts By High Performance Liquid Chromatography Coupled to Diode Array Detection and Tandem Mass Spectrometry," Journal of Chromatography A, 1414:138-146.

(Continued)

*Primary Examiner* — Jyoti Chawla
(74) *Attorney, Agent, or Firm* — MORRISON & FOERSTER LLP

(57) ABSTRACT

The present invention relates to agricultural marc, and food compositions incorporating such agricultural marc to improve the texture, flavor, aroma, mouthfeel, nutritional content, or shelf life of the food composition. In one example, the agricultural marc may be obtained from Chardonnay grapes, which when incorporated into chocolate can give the resulting composition an altered flavor and/or aromatic profile.

32 Claims, 12 Drawing Sheets

(56) References Cited

OTHER PUBLICATIONS

Jung, K.M. et al. (Oct. 2017). "Development and Characterization of Peach Powder-Added Chocolate and Chocolate-Covered Freeze-Dried Peach Snack," Journal of the East Asian Society of Dietary Life 27(5): 521-528. (English Abstract Only).

Kaack, K. et al. (May 20, 2005). "Low Energy Chocolate Cake With Potato Pulp and Yellow Pea Hulls," European Food Research and Technology 221(3): 367-375.

Machonis, P. et al. (Mar. 1, 2014). "Method For the Determination of Catechin and Epicatechin Enantiomers in Cocoa-Based Ingredients and Products By High-Performance Liquid Chromatography: First Action Apr. 2013," Journal of AOAC International, 97(2):506-509.

Martínez-Cervera, S. et al. (Apr. 2011) "Cocoa Fibre and Its Application as a Fat Replacer in Chocolate Muffins," LWT-Food Science and Technology 44(3): 729-736.

Miličević, D. et al, (2017). "Honey Biscuit With Sugar Beet Pulp and Apple Sweeps" CROSBI ID:912575, 3 pages (Abstract Only).

Ng, Y. V. et al. (Apr. 2020). "Effect off Overripe Banana Pulp Incorporation on Nutritional Composition, Physical Properties, and Sensory Acceptability Of Chocolate Cookies," International Food Research Journal 27(2): 252-260.

Oliveira, D.M. et al. (Jul.-Sep. 2013) "Sensory Analysis and Chemical Characterization of Cereal Enriched With Grape Peel and Seed Flour," Acta Scientiarum. Technology 35(3): 427-431.

Schultz H. (Dec. 2020) "Phenolaeis New Palm Fruit Extract/Chocolate Pairing Steps Up To Plate With White-Label-Ready Prototype." https://www.nutraingredients-usa.com/Article/2020/12/07/Phenolaeis-new-palm-fruit-extract-chocolate-pairing-steps-up-to-plate-with-white-label-ready-prototype? utm_source=EditorsSpotlight&utm_medium=email&utm_campaign=2020-12-07&c=2mKEXnWYoJOYg028%2BvBpUUuNy . . . .

Song, K.Y. et al. (2017). "Quality Properties and Antioxidant Activities of Chocolate With Variable Leaf Powder," Korean Journal of Food and Cookery Science 33(3): 247-255. (English Abstract Only).

Soukoulis, C. et al. (2018, e-pub. Aug. 30, 2017) "Grape, Raisin and Sugarcane Molasses as Potential Partial Sucrose Substitutes in Chocolate Ice Cream: A Feasibility Study," International Dairy Journal 76: 18-29.

Upshall, E. (Feb. 2021). "Lindt & Sprüngli Unveils Chocolate Bar Made With Entire Cocoa Pod," Foodbev Media, as retrieved on Jan. 28, 2022 https://www.foodbev.com/news/lindt-sprungli-unveils-chocolate-bar-made-with-the-entire-cocoa-pod/ , 2 pages.

Walker, R. et al. (2014). "Physicochemical, Nutritional, and Sensory Qualities of Wine Grape Pomace Fortified Baked Goods," Journal of Food Science 79(9): S1811-S1822.

Yoo, K. et al. (2011). "Preparation and Sensory Characteristics of Chocolate With Added Coffee Waste," The Korean Journal of Food and Nutrition 24(1): 111-116. (English Abstract Only).

çiftçi, O.N. et al. (2010) "Performance of a Cocoa Butter-Like Fat Enzymatically Produced From Olive Pomace Oil as a Partial Cocoa Butter Replacer," Journal of the American Oil Chemists' Society 87(9) :1013-1018.

\* cited by examiner

FOOD COMPOSITIONS INCORPORATING AGRICULTURAL MARC, AND METHODS OF PRODUCING THEREOF

CROSS REFERENCE TO RELATED APPLICATIONS

This application claims priority to U.S. Provisional Patent Application No. 63/092,976 filed on Oct. 16, 2020, the contents of which are incorporated herein by reference in their entirety.

FIELD

The present disclosure relates generally to food compositions, including chocolate compositions, and more specifically to food compositions that incorporate agricultural marc in a sustainable way that enhances the human sensory experience and improves nutrition in such compositions.

BACKGROUND

Agricultural processes impact the environment and contribute to global warming. One way to lessen the impact of agriculture on the environment is to maximize commercial use of agricultural byproducts. For instance, production of fruit results in large amounts of marc (also known in the art as pomace), which includes fruit skins, seeds and pulp. The marc has potential uses in food production. Valorization of different agricultural byproduct streams, such as agricultural marc, into food ingredients can increase the nutritional value and caloric content that can be derived per acre of crop production. However, these byproduct streams are often challenging to process and develop into ingredients that can be easily incorporated into food production systems or are attractive to consumers.

What is desired in the art are foods that are generally healthier for the average consumer without sacrificing sensory experience. What is also desired are foods with reduced sugar and/or incorporation of fruit or vegetable products in a way that preserves consumer acceptance. Thus, creating nutritionally-enhanced foods with favorable consumer reception remains a challenge in the food industry.

BRIEF SUMMARY

In some aspects, provided is a food composition comprising chocolate and agricultural marc. In some embodiments, the agricultural marc is present in an amount of between 1% and 50% by weight of the total food composition. In some embodiments, the weight ratio of chocolate to marc is between 1:1 and 100:1. In some variations of the foregoing, the food composition comprises cocoa butter present in an amount between 0.5% and 40% by weight of the total food composition. In some variations of the foregoing, the food composition has fruity or total fruit aromatic attributes, grape aromatic attributes, blueberry attributes, pleasant mouthfeel attributes, and/or sweet taste attributes, or any combination thereof, each independently at a rating of 0.5 or higher on a scale of 0 to 4. In additional variations of the foregoing, the food composition has bitter taste attributes and/or grape aromatic attributes each independently at a rating of 2.5 or lower on a scale of 0 to 4. In some variations of the foregoing, the food composition has an aromatic attribute selected from the group consisting of fruit complex, brown fruit, raisin, red fruit, and cherry cordial, or any combination thereof, each independently at a rating of 0.5 or higher on a scale of 0 to 15 (e.g., as measured using the Spectrum Descriptive Analysis method). In yet additional variations of the foregoing, the food composition has astringency flavor notes of 3.0 or lower, or has bitter flavor notes of 2.5 or lower, or a combination thereof, on a scale of 0 to 15 (e.g., as measured using the Spectrum Descriptive Analysis method). In still additional variations of the foregoing, the food composition has sweet flavor notes at a rating of between 6.0 and 10.0 on a scale of 0 to 15 (e.g., as measured using the Spectrum Descriptive Analysis method). In some variations, the food composition has a sugar content of less than 25% by weight, a fiber content above 10% by weight, or a combination thereof. In some variations of the foregoing, the agricultural marc is berry marc. In further variations of the foregoing, the agricultural marc is grape marc. In one variation of the foregoing, the agricultural marc is Chardonnay marc. In some variations, the agricultural marc has a particle size of less than 100 microns, less than 40 microns, or less than 20 microns. In one variation of the foregoing, the food composition has a shelf life of at least 6 months. In some variations of the foregoing, the food composition comprises (−)-epicatechin, (+)-catechin, (−)-catechin each independently in an amount of at least about 0.1 mg per 30 g serving of the food composition. In one variation of the foregoing, the food composition comprises a total amount of DP1-DP7 cocoa flavanols and procyanidins of at least about 10 g per 30 g serving of the food composition. In certain aspects, provided is a food composition comprising a base food product that is coated or filled with the claimed food composition.

In some aspects, provided is an agricultural marc powder having (i) an average particle size of less than 100 microns, (ii) a soluble fiber content of at least 5% by weight, or (iii) a polyphenol content of at least 0.1 mg GAE/g, or any combination of (i)-(iii). In certain aspects, provided is an agricultural marc powder having one or more of the following properties: (i) an average particle size of less than 100 microns, (ii) a soluble fiber content of at least 5% by weight, and (iii) a polyphenol content of at least 0.1 mg GAE/g. In one aspect, provided is a food composition comprising such agricultural marc.

In other aspects, provided is a method of preparing any of the food compositions described herein. In some embodiments, the method comprises: combining an agricultural marc with a chocolate base composition, or one or more ingredients of the chocolate base composition to produce the food composition. In some embodiments, the chocolate base composition comprises semi-sweet chocolate, dark chocolate, milk chocolate, white chocolate, or high-flavanol chocolate. In some variations, the chocolate base composition comprises cocoa solids, cocoa butter, or a combination thereof. In some variations, the chocolate base composition comprises further comprises nuts, creams, caramels, filling, toffee, milk or milk products, vegetable fats, color additives, flavorings, flavor extracts, emulsifiers, vitamins, minerals, salt, or artificial sweetener, or any combination thereof. In some embodiments, the chocolate composition comprising agricultural marc has increased fruity aromatic attributes, grape aromatic attributes, and/or sour aromatic attributes compared to a chocolate composition produced from the same chocolate base composition and lacking agricultural marc. In certain embodiments, the chocolate composition comprising agricultural marc has similar bitter taste attributes, sweet taste attributes, pleasant mouthfeel attributes, and/or grape aromatic attributes compared to a chocolate composition produced from the same chocolate base composition and lacking agricultural marc. In some embodiments, the chocolate composition comprising agricultural marc has decreased bitter taste attributes compared to a chocolate composition produced from the same chocolate base composition and lacking agricultural marc.

DESCRIPTION OF THE FIGURES

The present application can be understood by reference to the following description taken in conjunction with the accompanying figures.

FIG. 3B depicts the cocoa aromatic attributes of the chocolates. FIG. 3C depicts the fruity aromatic attributes of the chocolates. FIG. 3D depicts the inverse correlation between the cocoa and fruity aromatic attributes of the chocolates with an increasing concentration of Chardonnay marc. FIG. 3E depicts the roasty aromatic attributes of the chocolates. FIG. 3F depicts the pleasant mouthfeel attributes of the chocolates. FIG. 3G depicts the bitter taste attributes of the chocolates. FIG. 3H depicts the sweet taste attributes of the chocolates. FIG. 3I depicts the sour taste attributes of the chocolates. In each of FIGS. 3B-3C and 3E-3I, samples with no letters in common are significantly different from each other according to a Tukey-Kramer HSD test.

FIG. 4B depicts the cocoa aromatic attributes of the chocolates. FIG. 4C depicts the total fruit aromatic attributes of the chocolates. FIG. 4D depicts the blueberry aromatic attributes of the chocolates. FIG. 4E depicts the grape aromatic attributes of the chocolates. FIG. 4F depicts the caramelized aromatic attributes of the chocolates. FIG. 4G depicts the pleasant mouthfeel attributes of the chocolates. FIG. 4H depicts the bitter taste attributes of the chocolates. FIG. 4I depicts the sweet taste attributes of the chocolates. FIG. 4J depicts the sour taste attributes of the chocolates. In each of FIGS. 4B-4J, samples with no letters in common are significantly different from each other according to a Tukey-Kramer HSD test.

DETAILED DESCRIPTION

Figure 1:
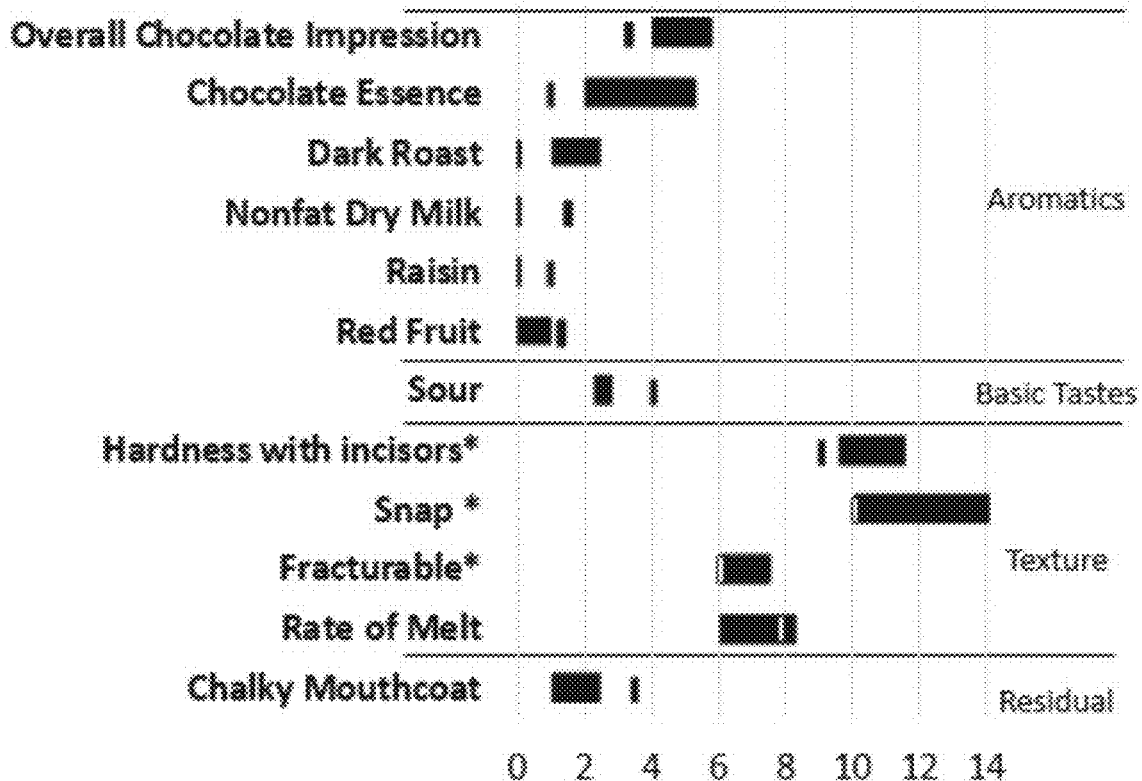
FIG. 1 depicts the sensory characteristics of chocolate containing Chardonnay marc as compared to control chocolates lacking Chardonnay marc. The chocolate with marc is shown as vertical lines, while the range of values for the control chocolates are shown as horizontal bars. Where the value for the chocolate containing marc overlaps with the control values, the value for the chocolate containing marc is shown as a white vertical line. The control chocolates did not have detectable nonfat dry milk or raisin aromatics.

The following description sets forth exemplary compositions, methods, parameters and the like. It should be recognized, however, that such description is not intended as a limitation on the scope of the present disclosure but is instead provided as a description of exemplary embodiments.

In some aspects, provided are food compositions that incorporate agricultural marc. In some embodiments, the food compositions are chocolate compositions. For example, in certain aspects, provided is a chocolate composition that incorporates agricultural marc.

Incorporation of agricultural marc into food compositions, including chocolate, can enhance the human sensory experience and improve nutrition of such food compositions. In some variations, incorporating agricultural marc into chocolate formulations may reduce bitterness, reduce astringency, alter textural and visual appeal, improve mouthfeel, and/or enhance flavor and aroma profile. In certain variations, such incorporation may lead to functional improvements in the resulting chocolate composition. For example, incorporating agricultural marc derived from fruits or vegetables into chocolate formulations can improve shelf life, reduce costs of inputs, alter the ratios of other ingredients, increase fiber content, increase dietary phenol content, decrease sugar content, and/or decrease total caloric content.

The following describes the agricultural marc, the food compositions, and the methods of producing such food compositions in further detail.

Agricultural Marc

In some embodiments, agricultural marc comprises byproduct resulting from the harvesting and processing of fruits or vegetables. Marc is also known in the art as pomace. In some embodiments, marc can include seeds, skins, rinds, pulp, juice, oil, or any other component of a fruit or vegetable that is not utilized in the primary purpose of fruit or vegetable processing, or is produced as a byproduct within a fruit or vegetable processing process. For example, in one variation, grape marc may include grape stems, seeds, skins, oils, and pulp that are not utilized in a wine or juice production.

In certain embodiments, agricultural marc may be obtained from any process that produces juice or oil from fruits or vegetables. In some embodiments, the agricultural marc is obtained from vine-grown fruits and vegetables. For example, in one variation, the agricultural marc is obtained from tomato, grape, berries, cucumber, melon, kiwifruit, passionfruit, or squash. In another variation, agricultural marc may be obtained from red or blue berries, including, but not limited to, red grape, white grape, cranberry, blueberry, blackberry, raspberry, mulberry, huckleberry, chokeberry, elderberry, gooseberry, lingonberry, boysenberry, red currant, black currant, acai berry, goji berry, or cape gooseberry. In certain embodiments, the agricultural marc is obtained from tree fruits. For example in some variations, agricultural marc may be derived from apple, olive, avocado, pomegranate, guava, papaya, citrus fruit, or stone fruit. In some variations, agricultural marc may be derived from orange, lemon, lime, grapefruit, tangerine, pomelo, kumquat, tangelo, yuzu, or citron. In some variations, agricultural marc may be derived from mango, peach, plum, apricot, cherry, nectarine, lychee, or coconut. In certain embodiments, the agricultural marc is derived from root vegetables. For example, in some variations, agricultural marc may be derived from carrot, beet, or potato. In yet additional embodiments, agricultural marc may be derived from pineapples, celery, leafy green vegetables, kale, spinach, herbs, sugarcane, palm, or any other fruit or vegetable. In some embodiments, the agricultural marc may be derived from any part of a plant grown in the process of producing the fruits or vegetables described herein. In some embodiments, agricultural marc is derived from any combination of sources described herein.

In some embodiments, the agricultural marc comprises or consists essentially of a fruit marc. In certain embodiments, the agricultural marc comprises or consists essential of a berry marc. In some variations, the agricultural marc comprises or consists essentially of blueberry marc. In some embodiments, the agricultural marc comprises or consists essentially of a grape marc. In certain embodiments, the agricultural marc comprises or consists essentially of Chardonnay marc. In certain embodiments, the agricultural marc comprises or consists essentially of Concord grape marc. In some embodiments, the agricultural marc comprises a mixture of two or more agricultural marcs described herein.

In some variations, the agricultural marc used herein may be obtained using any known methods or techniques, or be purchased from any commercially available sources. In certain variations, the agricultural marc may undergo one or more processing steps prior to incorporation to prepare the food composition. In some variations, the agricultural marc is crushed, milled, ground, homogenized, passed through a screen or sieve, centrifuged, micronized, pulverized, rinsed (e.g., by washing with water) and/or dried (e.g., removing water by pressing and/or other drying techniques).

In certain embodiments, the agricultural marc comprises an agricultural marc powder having an average particle size of less than 100 microns (i.e., micrometers (μm)). In some variations, the agricultural marc powder comprises soluble fiber present in an amount of 5% of the weight of the pure marc powder. In other variations, the agricultural marc powder comprises phenols present in an amount of at least 0.1 mg gallic acid equivalent per gram of pure agricultural marc powder (mg GAE/g).

In some embodiments, the agricultural marc incorporated into the food composition has an average particle size of less than or equal to 150 microns, less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 20 microns, or less than or equal to 10 microns, less than or equal to 5 microns, less than or equal to 1 micron, less than or equal to 0.5 micron, or less than or equal to 0.1 micron; or between 0.1 micron and 0.5 micron, between 0.5 micron and 1 micron, between 1 micron and 5 microns, between 5 microns and 10 microns, between 10 microns and 20 microns, between 10 microns and 30 microns, between 15 microns and 25 microns, between 15 microns and 30 microns, between 20 microns and 30 microns, between 20 microns and 35 microns, between 20 microns and 40 microns, between 25 microns and 35 microns, between 25 microns and 40 microns, between 30 microns and 40 microns, between 40 microns and 50 microns, between 50 microns and 60 microns, between 60 microns and 70 microns, between 70 microns and 80 microns, between 80 microns and 90 microns, or between 90 microns and 100 microns.

The average particle size of the agricultural marc in the food composition can be reduced using any suitable methods or techniques known in the art. For example, grinding or milling may be employed to reduce the particle size of agricultural marc to the desired range prior to incorporation into the food composition. In some embodiments, the agricultural marc is dry-milled prior to incorporation into the food composition. The average particle size of the agricultural marc in the food composition can be measured using any suitable methods or techniques known in the art including, but not limited to, by micrometer or laser diffraction.

In some variations, the reduced particle size of the agricultural marc incorporated into the food composition can improve consumer experience and/or utility, for example, by improving product stability and replacing stabilizers; increasing soluble fiber content and bioavailability; increasing dietary phenol content and bioavailability; improving aromatic and flavor profiles in the food composition; lowering the cost of agricultural marc utilization; increasing nutritional benefit; improving production efficiency; and/or altering formulations of ingredients to reduce overall production costs.

In some embodiments, the agricultural marc powder has a soluble fiber content of at least 5% of the weight of the pure marc powder. In some variations, the agricultural marc powder has a soluble fiber content of at least 10%, at least 20%, at least 30%, at least 40%, at least 50%, at least 60%, or at least 70% by weight. In other variations, the agricultural marc powder has a soluble fiber content between 5% and 10%, between 10% and 20%, between 20% and 30%, between 30% and 40%, between 40% and 50%, between 50% and 60%, or between 60% and 70% by weight.

In some embodiments, the agricultural marc comprises an amount of phenols and/or polyphenols, which may include, but are not limited to, flavonoids (e.g., flavanols, also known as flavan-3-ols), phenolic acids, stilbenes, and the like. In some embodiments, the agricultural marc powder has a total phenolic content of at least 0.1 mg GAE/g. Gallic acid equivalents (GAE) is a standard means of expressing total phenolic content in a sample. GAE can be determined by the Folin Ciocalteau method (Taga, M. S.; Miller, E. E.; Pratt, D. E. Chia seeds as a source of natural lipid antioxidants. Journal of American Oil Chemistry Society 1984, 61, 928-931), or using any suitable means known in the art. In some variations, the agricultural marc powder may have a total phenolic content of at least 0.5 mg GAE/g, at least 1 mg GAE/g, at least 5 mg GAE/g, at least 10 mg GAE/g, at least 20 mg GAE/g, at least 30 mg GAE/g, at least 40 mg GAE/g, at least 50 mg GAE/g, at least 60 mg GAE/g, at least 70 mg GAE/g, at least 80 mg GAE/g, or at least 90 mg GAE/g. In other variations, the agricultural marc powder may have a total phenolic content of between 0.1 mg GAE/g and 0.5 mg GAE/g, between 0.5 mg GAE/g and 1 mg GAE/g, between 1 mg GAE/g and 5 mg GAE/g, between 5 mg GAE/g and 10 mg GAE/g, between 10 mg GAE/g and 20 mg GAE/g, between 20 mg GAE/g and 30 mg GAE/g, between 30 mg GAE/g and 40 mg GAE/g, between 40 mg GAE/g and 50 mg GAE/g, between 50 mg GAE/g and 60 mg GAE/g, between 60 mg GAE/g and 70 mg GAE/g, between 70 mg GAE/g and 80 mg GAE/g, or between 80 mg GAE/g and 90 mg GAE/g.

In some embodiments, the agricultural marc comprises flavonoids. In certain embodiments, the agricultural marc comprises flavan-3-ols. In some variations, the agricultural marc comprises (−)-gallocatechin, (−)-epigallocatechin, (+)-catechin, (−)-epigallocatechin gallate, (−)-epicatechin, (−)-epicatechin gallate, or any combination thereof. In some variations, the agricultural marc comprises (−)-gallocatechin in an amount of at least about 100 mg/kg dry weight (e.g., at least about 100 mg/kg, at least about 250 mg/kg, at least about 500 mg/kg, at least about 750 mg/kg, at least about 1,000 mg/kg, at least about 1,250 mg/kg, or at least about 1,500 mg/kg dry weight). In additional variations, the agricultural marc comprises (−)-epigallocatechin in an amount of at least 50 mg/kg dry weight (e.g., at least about 50 mg/kg, at least about 100 mg/kg, at least about 125 mg/kg, at least about 150 mg/kg, at least about 175 mg/kg, at least about 200 mg/kg, at least about 225 mg/kg, or at least about 250 mg/kg dry weight). In some variations, the agricultural marc comprises (+)-catechin in an amount of at least about 50 mg/kg dry weight (e.g., at least about 50 mg/kg, at least about 100 mg/kg, at least about 200 mg/kg, at least about 300 mg/kg, at least about 400 mg/kg, at least about 500 mg/kg, or at least about 600 mg/kg dry weight). In additional variations, the agricultural marc comprises (−)-epigallocatechin gallate in an amount of at least about 1 mg/kg dry weight (e.g., at least about 1 mg/kg, at least about 5 mg/kg, at least about 10 mg/kg, at least about 15 mg/kg, at least about 20 mg/kg, or at least about 25 mg/kg dry weight). In certain variations, the agricultural marc comprises (−)-epicatechin in an amount of at least about 100 mg/kg dry weight (e.g., at least about 100 mg/kg, at least about 200 mg/kg, at least about 300 mg/kg, at least about 400 mg/kg, at least about 500 mg/kg, at least about 600 mg/kg, at least about 700 mg/kg, or at least about 800 mg/kg dry weight). In additional variations, the agricultural marc comprises (−)-epicatechin gallate in an amount of at least about 1 mg/kg dry weight (e.g., at least about 1 mg/kg, at least about 5 mg/kg, at least about 10 mg/kg, at least about 15 mg/kg, at least about 20 mg/kg, or at least about 25 mg/kg dry weight).

In some embodiments, the agricultural marc comprises phenolic acids. For example, in certain embodiments, the agricultural marc comprises gallic acid, vanillic acid, or a combination thereof. In some variations, the agricultural marc comprises gallic acid in an amount of at least 10 mg/kg dry weight (e.g., at least about 10 mg/kg, at least about 20 mg/kg, at least about 40 mg/kg, at least about 60 mg/kg, at least about 80 mg/kg, at least about 100 mg/kg, or at least about 120 mg/kg dry weight). In some variations, the agricultural marc comprises vanillic acid in an amount of at least 1 mg/kg dry weight (e.g., at least about 1 mg/kg, at least about 2 mg/kg, at least about 4 mg/kg, at least about 6 mg/kg, at least about 8 mg/kg, at least about 10 mg/kg, at least about 12 mg/kg, or at least about 15 mg/kg dry weight).

In some embodiments, the agricultural marc comprises stilbenes. For example, in certain embodiments, the agricultural marc comprises trans-resveratrol. In some variations, the agricultural marc comprises trans-resveratrol in an amount of at least about 1 mg/kg dry weight (e.g., at least about 1 mg/kg, at least about 5 mg/kg, at least about 10 mg/kg, at least about 15 mg/kg, at least about 20 mg/kg, or at least about 25 mg/kg dry weight).

In certain embodiments, the agricultural marc is derived from seeds. For example, in one variation to obtain agricultural marc from seeds, the seeds may first be separated from skins, stems, and/or leaves. The seeds are then pressed to separate seed oil (e.g., by cold press, hot press, or solvent extraction methods), leaving behind a de-fatted seed material after oil pressing (e.g., a meal or flour). The meal or flour can be dried, and then processed using any of the particle size reduction techniques described herein to yield the agricultural marc in powder form. In one variation, agricultural marc is derived from grape seeds that have been dried and pressed to release the seed oil. In another variation, agricultural marc is derived from milling of fruit or vegetable seeds. In other variations, agricultural marc is derived from olives. In another variation, olives may be milled and malaxed to extract the oil, and the resulting agricultural marc byproduct is utilized in the food compositions.

Grape Marc

In some embodiments, grape marc is used in the food compositions described herein. The grape plant from which grape marc is obtained may be any species of the genus *Vitis*. For example, grape marc may be derived from *Vitis vinifera, Vitis amurensis, Vitis labrusca, Vitis mustangensis, Vitis riparia,* or *Vitis rotundifolia*. The grape marc may be obtained from any suitable grape variety, including for example, Chardonnay, Concord, Pinot Noir, Pinot Grigio, Sauvignon Blanc, Cabernet Sauvignon, Zinfandel, Merlot, Malbec, Thompson, Mauzac, Grenache, Grenache Blanc, Syrah, Riesling, Viognier, or any combination thereof.

In some embodiments, the agricultural marc comprises or consists essentially of marc from a fruit of a plant of the clade Rosids. In some embodiments, the agricultural marc comprises or consists essentially of grape marc. In certain embodiments, the agricultural marc comprises or consists essentially of marc from a fruit of a plant in the order Vitales. In certain embodiments, the agricultural marc comprises or consists essentially of marc from a fruit of a plant in the family Vitaceae. In certain embodiments, the agricultural marc comprises or consists essentially of marc from a fruit of a plant in the genus *Vitis*. In certain embodiments, the agricultural marc comprises or consists essentially of Chardonnay marc. In certain embodiments, the agricultural marc comprises or consists essentially of Concord grape marc. In some embodiments, the agricultural marc comprises a mixture of two or more grape marcs described herein.

In some embodiments, the grape from which marc is obtained is a grape grown in a coastal region. In some embodiments, the grape is a grape grown in a Winkler region climate type I, II, III, IV or V. In some variations, the agricultural marc is obtained from grapes grown in the coastal valleys of Northern California, e.g., the Napa Valley and/or the Sonoma Valley. In another variation, the grape marc is obtained from grapes grown in other, hotter, inland valley vineyards, including any other suitable environments, states and/or countries.

In some embodiments, the food compositions incorporate Chardonnay marc, Concord grape marc, Pinot Noir marc, Pinot Grigio marc, Sauvignon Blanc marc, Cabernet Sauvignon marc, Zinfandel marc, Merlot marc, Malbec marc, Thompson marc, Mauzac marc, Grenache marc, Grenache Blanc marc, Syrah marc, Riesling marc, Viognier marc, or any combination thereof. In some embodiments, the grape marc comprises Chardonnay marc, Concord grape marc, or a combination thereof. In one variation, the grape marc is Chardonnay marc. In another variation, the grape marc is Concord grape marc.

In some embodiments, grape marc may be derived from a juice production process. For example, in some variations grapes are crushed to produce juice, and the remaining stems, leaves, skins, pulp, and/or seeds are utilized for grape marc. In other embodiments, grape marc is derived from a wine fermentation process. For example, in other variations, grape marc is derived from crushed whole grapes, including stems, leaves, skins, pulp, and/or seeds, which have undergone a fermentation process. In yet another variation, grape marc is derived from yeast lees, including, for example, the residue of pressed grapes, small pieces of stalks, yeast cells, and other byproducts from the wine fermentation process. Grape marc derived from a wine-making process may also be known in the art as wine marc or wine pomace.

Grape marc may generally be obtained using any suitable processes known in the art. For example, grape marc may be obtained from a juice production process. The grape marc may be passed through a crusher/destemmer to remove stems and leaves. Any stones and/or metal present in the marc may also be removed using any suitable techniques known in the art. The marc may be rinsed with water, following by pressing to remove at least a portion of the water. The marc may be further dried using any suitable means known in the art including, for example, conducive heat or hot air drying. Any particle size reduction technique known in the art or described herein may then be employed to produce a marc powder from the dried marc.

In other embodiments, grape marc is made by separating and drying grape seeds, for example, from the materials produced after grapes are pressed to produce grape juice (e.g., to make wine). The grape seeds can be "cold-pressed" to defat them (producing seed oil as a byproduct). After the oil is expelled, the press cake can be milled to produce an agricultural marc in powder form. In one embodiment, after juicing, the grape seed is separated from the skins, cleaned, dried, mechanically defatted, finely milled and sifted to create a marc with the average particle sizes described herein.

In yet other embodiments, the grape marc is obtained from a defatted portion of the grape seed. In some variations, the grape marc comprises defatted grape seeds that are not extractable by an organic solvent, e.g., are not extractable by ethanol and/or methanol. In certain aspects, the grape marc is prepared from seeds having an epicatechin content of at least 600 mg of epicatechin per 100 g of seeds or an epicatechin content of at least 700 mg of epicatechin per 100 g of seeds. In specific embodiments, the epicatechin content ranges from 600-800 mg/100 g of seeds or from 650-800 mg/100 g of seeds.

In some embodiments, the grape marc may be derived from whole grape marc or a portion thereof including fractions of seed, skin, leaf, stem, and the like. These fractions can also be present in a mixture of different ratios.

In some embodiments, grape marc can also be purchased from a variety of sources, which are often sold as seed flours. The seed flour may be purchased as grape marc in powder form. In some embodiments, this is product is further milled and sifted to produce a grape marc with a smaller particle size.

In some embodiments, the grape marc is a Chardonnay marc. In certain embodiments, the grape marc is a Chardonnay marc having an average particle size of less than 300 microns. In one variation, the grape marc is a Chardonnay marc having a particle size of about 250 microns. In certain embodiments, the grape marc is a Chardonnay marc having an average particle size of less than 100 microns. In certain embodiments, the grape marc is a Chardonnay marc having an average particle size of less than 40 microns. In certain embodiments, the grape marc is a Chardonnay marc having an average particle size of between about 30 microns and about 40 microns. In one embodiment, the grape marc is a Chardonnay marc having a particle size of about 35 microns.

In some embodiments, the grape marc (e.g., Chardonnay marc) comprises flavan-3-ols, phenolic acids, stilbenes, or a combination thereof. In certain embodiments, the grape marc (e.g., Chardonnay marc) comprises (−)-gallocatechin in an amount of between about 1,200 mg/kg and about 1,800 mg/kg dry weight (e.g., about 1,500 mg/kg dry weight). In certain embodiments, the grape marc (e.g., Chardonnay marc) comprises (−)-epigallocatechin in an amount of between about 200 mg/kg and about 300 mg/kg dry weight (e.g., about 250 mg/kg dry weight). In certain embodiments, the grape marc (e.g., Chardonnay marc) comprises (+)-catechin in an amount of between about 500 mg/kg and about 850 mg/kg dry weight (e.g., about 670 mg/kg dry weight). In certain embodiments, the grape marc (e.g., Chardonnay marc) comprises (−)-epigallocatechin gallate in an amount of between about 20 mg/kg and about 30 mg/kg dry weight (e.g., about 25 mg/kg dry weight). In certain embodiments, the grape marc (e.g., Chardonnay marc) comprises (−)-epicatechin in an amount of between about 700 mg/kg and about 1,100 mg/kg dry weight (e.g., about 900 mg/kg dry weight). In certain embodiments, the grape marc (e.g., Chardonnay marc) comprises (−)-epicatechin gallate in an amount of between about 20 mg/kg and about 30 mg/kg dry weight (e.g., about 25 mg/kg dry weight). In certain embodiments, the grape marc (e.g., Chardonnay marc) comprises gallic acid in an amount of between about 90 mg/kg and about 140 mg/kg dry weight (e.g., about 115 mg/kg dry weight). In certain embodiments, the grape marc (e.g., Chardonnay marc) comprises vanillic acid in an amount of between about 10 mg/kg and about 20 mg/kg dry weight (e.g., about 15 mg/kg dry weight). In certain embodiments, the grape marc (e.g., Chardonnay marc) comprises trans-resveratrol in an amount of between about 20 mg/kg and about 30 mg/kg dry weight (e.g., about 26 mg/kg dry weight).

Food Compositions

The agricultural marc described herein is incorporated into food compositions. In some embodiments, the food composition comprises agricultural marc incorporated into chocolate.

Chocolate may be produced by various methods and techniques known in the art. For example, in some variations, the chocolate is produced from cocoa beans that have been fermented, dried, roasted, and separated from their skins. The beans are ground into a cocoa paste, then melted to form a liquor, which may be separated into cocoa solids and cocoa butter, or cooled and molded into raw chocolate. The raw chocolate may be combined with varying amounts of additional cocoa butter to form different types of chocolate.

In some variations, the food composition comprises agricultural marc incorporated into chocolate liquor (also referred to as unsweetened chocolate or cocoa liquor). In some variations, the food composition comprises agricultural marc combined with one or more of cocoa butter, cocoa powder, or cocoa solids. In certain variations, the agricultural marc is incorporated into chocolate, wherein the chocolate is dark chocolate, baking chocolate, milk chocolate, sweet chocolate, semi-sweet chocolate, buttermilk chocolate, skim-milk chocolate, mixed dairy product chocolate, low fat chocolate, or white chocolate. In one embodiment, the chocolate is compound chocolate. In some variations, the chocolate comprises cocoa powder, vegetable fats, and sugar. In other variations, the chocolate compositions comprise tropical fats or oils, such as, for example, coconut oil or palm oil.

In certain embodiments, the chocolate composition is in the form of chocolate candies, chocolate bars, chocolate chips, chocolate coatings, chocolate-flavored confections, chocolate-flavored compound coatings, chocolate drinks, or other chocolate-based or chocolate-flavored products. In certain variations, the chocolate composition may be unsweetened, semi-sweet or dark chocolate, or have unsweetened chocolate, semi-sweet chocolate, dark chocolate, or chocolate liquor as a base composition.

In some variations, the chocolate composition comprises high-flavanol chocolate. In certain variations, the chocolate composition contains enhanced levels of flavanols. Thus, in certain variations, agricultural marc is incorporated into high-flavanol chocolate-based products, or have a high-flavanol chocolate as a base composition.

In certain embodiments, the food compositions may further include one or more additional ingredients. In some variations, the chocolate compositions further include sugar, cocoa butter, milk or milk products, vegetable fats, color additives, flavor extracts (e.g., vanilla), emulsifiers, vitamins, minerals, inulin, dietary fiber, artificial sweeteners, intense sweeteners, sugar alcohols, and/or any other ingredients commonly used in the art in making chocolate compositions. Examples of other suitable ingredients may include, but are not limited to, nuts, creams, caramels, fillings, nut butters, chicory root, or toffees. In another variation, the chocolate composition further includes almonds, cocoa nibs, sea salt, smoked salt, and/or dried cherries. Any combination of the additional ingredients described herein may be present in the food composition.

In some embodiments wherein the food composition is a chocolate composition, the chocolate composition has an average particle size of between 5 microns and 40 microns. In some variations, the chocolate composition has a particle size of between 5 microns and about 10 microns, between 5 microns and 15 microns, between 5 microns and 20 microns, between 10 microns and 15 microns, between 10 microns and 20 microns, between 10 microns and 25 microns, between 15 microns and 20 microns, between 15 microns and 25 microns, between 15 microns and 30 microns, In some embodiments, the food composition comprises a base food coated and/or filled with the chocolate compositions incorporating agricultural marc as described herein. For example, in some variations, the food composition is a food product with a chocolate coating, wherein the chocolate coating comprises agricultural marc incorporated into the chocolate. In other variations, the food composition is a food product with a chocolate filling, wherein the chocolate filling comprises agricultural marc incorporated into the chocolate. In certain embodiments, food products which may be coated or filled with a chocolate composition comprising agricultural marc include confectionary products, breads, pastries, snacks, ice cream, candies, wafers, nuts, chips, pretzels, fruits, cookies, cakes, nutritional supplements (e.g., fiber supplements), or any other type of food product.

In other aspects, provided are articles of manufacture comprising the food compositions of the present disclosure in suitable packaging. In some embodiments, the articles of manufacture further comprises a label (e.g., nutritional label).

Marc Content

In some embodiments, the agricultural marc is present in an amount of at least 0.5%, at least 1%, at least 5%, at least 10%, at least 15%, at least 20%, or at least 25% by weight of the total food composition. In certain embodiments, the agricultural marc is present in an amount of between 5% and 10%, between 5% and 15%, between 10% and 15%, between 10% and 20%, between 15% and 20%, between 15% and 25%, between 15% and 30%, between 20% and 25%, between 20% and 30%, between 25% and 30%, between 25% and 35%, between 30% and 35%, between 30% and 40%, or between 40% and 50% by weight of the total food composition. In some embodiments, the agricultural marc is present in an amount of about 5%, about 10%, about 15%, about 20%, about 25%, about 30%, about 35%, about 40%, or about 45% by weight of the total composition. In one embodiment, the agricultural marc is present in an amount of about 15% by weight of the total food composition. In another embodiment, the agricultural marc is present in an amount of less than 15% by weight of the total food composition. In yet another embodiment, the agricultural marc is present in an amount of greater than 15% by weight of the total food composition.

In some variations wherein the food composition is a chocolate composition, the weight ratio of agricultural marc to chocolate is at least 1:10, at least 1:8, at least 1:5, at least 1:4, at least 1:3, or at least 1:2; or between 1:10 and 1:8, between 1:8 and 1:5, between 1:5 and 1:4, between 1:4 and 1:3, between 1:3 and 1:2, or between 1:2 and 1:1. In some variations wherein the food composition is a chocolate composition, the weight ratio of chocolate (i.e., all chocolate ingredients including chocolate liquor, cocoa butter, etc.) to agricultural marc is between 1:1 and 10:1 (e.g., about 1:1, about 2:1, about 3:1, about 4:1, about 5:1, about 6:1, about 7:1, about 8:1, about 9:1, or about 10:1). In some variations wherein the food composition is a chocolate composition, the weight ratio of chocolate (i.e., all chocolate ingredients including chocolate liquor, cocoa butter, etc.) to agricultural marc is between about 2:1 and about 6:1. In one variation wherein the food composition is a chocolate composition, the weight ratio of chocolate to marc is about 4:1. In other variations wherein the food composition is a chocolate composition, the weight ratio of chocolate to marc is between about 1:1 and about 3:1. In still other variations wherein the food composition is a chocolate composition, the weight ratio of chocolate to marc is between about 6:1 and about 10:1.

In some variations wherein the food composition is a chocolate composition, the chocolate composition has a ratio of cocoa butter to marc of at least 1:2, at least 1:1, or at least 2:1; or between 1:2 and 1:1, or between 1:1 and 2:1. In some variations wherein the food composition is a chocolate composition, the weight ratio of cocoa butter to agricultural marc is between 1:2 and 10:1 (e.g., about 1:2, about 1:1, about 2:1, about 3:1, about 4:1, about 5:1, about 6:1, about 7:1, about 8:1, about 9:1, or about 10:1). In some variations wherein the food composition is a chocolate composition, the weight ratio of cocoa butter to agricultural marc is between about 1:1 and about 5:1. In one variation wherein the food composition is a chocolate composition, the weight ratio of cocoa butter to agricultural marc is about 2:3 (i.e., about 1.5:1).

In some embodiments wherein the food composition is a chocolate composition, the chocolate composition comprises at least 5% fruit marc (e.g., berry marc) by weight of the total composition (e.g., about 5%, about 10%, about 15%, about 20%, about 25%, about 30%, about 35%, about 40%, or about 45% by weight of the total composition). In certain embodiments wherein the food composition is a chocolate composition, the chocolate composition comprises fruit marc (e.g., berry marc), wherein the weight ratio of chocolate to fruit marc (e.g., berry marc) is between 10:1 and 1:1 (e.g., between 10:1 and 1:1, or between 10:1 and 2:1, between 10:1 and 3:1, between 6:1 and 1:1, between 6:1 and 2:1, between 6:1 and 3:1, between 4:1 and 1:1, between 4:1 and 2:1, or between 4:1 and 3:1). In another embodiment, the berry marc is present in an amount of less than 15% by weight of the total food composition. In yet another embodiment, the berry marc is present in an amount of greater than 15% by weight of the total food composition. In other variations wherein the food composition is a chocolate composition, the weight ratio of chocolate to berry marc is between about 1:1 and about 3:1. In still other variations wherein the food composition is a chocolate composition, the weight ratio of chocolate to berry marc is between about 6:1 and about 10:1.

In some embodiments wherein the food composition is a chocolate composition, the chocolate composition comprises at least 5% blueberry marc by weight of the total composition (e.g., about 5%, about 10%, about 15%, about 20%, about 25%, about 30%, about 35%, about 40%, or about 45%). In certain embodiments wherein the food composition is a chocolate composition, the chocolate composition comprises about 15% blueberry marc by weight of the total composition. In certain embodiments wherein the food composition is a chocolate composition, the chocolate composition comprises blueberry marc, wherein the weight ratio of chocolate to blueberry marc is between 10:1 and 1:1 (e.g., between 10:1 and 1:1, or between 10:1 and 2:1, between 10:1 and 3:1, between 6:1 and 1:1, between 6:1 and 2:1, between 6:1 and 3:1, between 4:1 and 1:1, between 4:1 and 2:1, or between 4:1 and 3:1). In certain embodiments wherein the food composition is a chocolate composition, the chocolate composition comprises blueberry marc, wherein the weight ratio of chocolate to blueberry marc is between 6:1 and 2:1. In certain embodiments, wherein the food composition is a chocolate composition, the chocolate composition comprises blueberry marc, wherein the weight ratio of chocolate to blueberry marc is between 6:1 and 3:1.

In some embodiments wherein the food composition is a chocolate composition, the chocolate composition comprises at least 5% grape marc by weight of the total composition (e.g., about 5%, about 10%, about 15%, about 20%, about 25%, about 30%, about 35%, about 40%, or about 45% by weight of the total composition). In certain embodiments wherein the food composition is a chocolate composition, the chocolate composition comprises grape marc, wherein the weight ratio of chocolate to grape marc is between 10:1 and 1:1 (e.g., between 10:1 and 1:1, or between 10:1 and 2:1, between 10:1 and 3:1, between 6:1 and 1:1, between 6:1 and 2:1, between 6:1 and 3:1, between 4:1 and 1:1, between 4:1 and 2:1, or between 4:1 and 3:1). In certain embodiments wherein the food composition is a chocolate composition, the chocolate composition comprises grape marc, wherein the weight ratio of chocolate to grape marc is between 6:1 and 2:1. In certain embodiments, wherein the food composition is a chocolate composition, the chocolate composition comprises grape marc, wherein the weight ratio of chocolate to grape marc is between 6:1 and 3:1. In another embodiment, the grape marc is present in an amount of less than 15% by weight of the total food composition. In yet another embodiment, the grape marc is present in an amount of greater than 15% by weight of the total food composition. In other variations wherein the food composition is a chocolate composition, the weight ratio of chocolate to grape marc is between about 1:1 and about 3:1. In still other variations wherein the food composition is a chocolate composition, the weight ratio of chocolate to grape marc is between about 6:1 and about 10:1.

In some embodiments wherein the food composition is a chocolate composition, the chocolate composition comprises at least 5% Chardonnay marc by weight of the total composition (e.g., about 5%, about 10%, about 15%, about 20%, about 25%, about 30%, about 35%, about 40%, or about 45% by weight of the total composition). In certain embodiments wherein the food composition is a chocolate composition, the chocolate composition comprises about 15% Chardonnay marc by weight of the total composition. In other embodiments, the chocolate composition comprises Chardonnay marc in an amount of less than 15% by weight of the total composition. In yet other embodiments, the chocolate composition comprises Chardonnay marc in an amount of greater than 15% of the total composition. In certain embodiments, the chocolate composition comprises Chardonnay marc in an amount of at least 5% and less than 15% of the total composition. In other embodiments, the chocolate composition comprises Chardonnay marc in an amount of greater than 15% and up to 37.5% by weight of the total composition. In certain embodiments wherein the food composition is a chocolate composition, the chocolate composition comprises Chardonnay marc, wherein the weight ratio of chocolate to Chardonnay marc is between 25:1 and 1:1 (e.g., between 25:1 and 1:1, between 25:1 and 2:1, 25:1 and 3:1, between 10:1 and 1:1, between 10:1 and 2:1, between 10:1 and 3:1). In certain embodiments wherein the food composition is a chocolate composition, the chocolate composition comprises Chardonnay marc, wherein the weight ratio of chocolate to Chardonnay marc is between 10:1 and 3:1. In certain embodiments, wherein the food composition is a chocolate composition, the chocolate composition comprises Chardonnay marc, wherein the weight ratio of chocolate to Chardonnay marc is between 6:1 and 4:1. In other embodiments wherein the food composition is a chocolate composition, the chocolate composition comprises Chardonnay marc, wherein the weight ratio of chocolate to Chardonnay marc is between 1:1 and 3:1. In still other embodiments, wherein the food composition is a chocolate composition, the chocolate composition comprises Chardonnay marc, wherein the weight ratio of chocolate to Chardonnay marc is between 5:1 and 10:1.

In some embodiments wherein the food composition is a chocolate composition, the chocolate composition comprises at least 5% Concord grape marc by weight of the total composition (e.g., about 5%, about 10%, about 15%, about 20%, about 25%, about 30%, about 35%, about 40%, or about 45% by weight of the total composition). In certain embodiments wherein the food composition is a chocolate composition, the chocolate composition comprises about 15% Concord grape marc by weight of the total composition. In certain embodiments wherein the food composition is a chocolate composition, the chocolate composition comprises Concord grape marc, wherein the weight ratio of chocolate to Concord grape marc is between 25:1 and 1:1 (e.g., between 25:1 and 1:1, between 25:1 and 2:1, 25:1 and 3:1, between 10:1 and 1:1, between 10:1 and 2:1, between 10:1 and 3:1). In certain embodiments wherein the food composition is a chocolate composition, the chocolate composition comprises Concord grape marc, wherein the weight ratio of chocolate to Concord grape marc is between 10:1 and 3:1. In certain embodiments wherein the food composition is a chocolate composition, the chocolate composition comprises Concord grape marc, wherein the weight ratio of chocolate to Concord grape marc is between 6:1 and 4:1.

In certain embodiments, the chocolate composition is prepared using a chocolate base composition, as described herein. In some embodiments, the chocolate base composition comprises an amount of polyphenols. In some variations, the weight ratio of agricultural marc to the polyphenols in the chocolate base composition is at least 1:1, at least 3:1, at least 5:1, at least 10:1, or at least 15:1; or between 1:1 and 3:1, between 3:1 and 5:1, between 5:1 and 10:1, or between 10:1 and 15:1. In some embodiments, the chocolate base composition comprises an amount of dietary fiber. In some variations, the weight ratio of agricultural marc to the dietary fiber in the chocolate base composition is at least 1:1, at least 3:1, at least 5:1, at least 10:1, or at least 15:1; or between 1:1 and 3:1, between 3:1 and 5:1, between 5:1 and 10:1, or between 10:1 and 15:1.

In some embodiments, the chocolate composition comprises flavonoids, stilbenes, phenolic acids, or any combination thereof. In certain embodiments, the chocolate composition comprises flavanols (also known as flavan-3-ols). In some variations, the chocolate composition comprises (−)-gallocatechin, (−)-epigallocatechin, (+)-catechin, (−)-epigallocatechin gallate, (−)-epicatechin, (−)-epicatechin gallate, or any combination thereof. In certain variations, the chocolate composition comprises (−)-epicatechin, (+)-catechin, (−)-catechin, or any combination thereof. In some variations, the chocolate composition comprises (−)-epicatechin in an amount of at least about 0.1 mg/g of the chocolate composition after defatting (e.g., at least about 0.1 mg/g, at least about 0.5 mg/g, at least about 1.0 mg/g, at least about 1.5 mg/g, at least about 2.0 mg/g, or at least about 2.5 mg/g of the chocolate composition after defatting). In certain variations, the chocolate composition comprises (+)-catechin in an amount of at least about 2 mg per 30 g serving of the chocolate composition (e.g., at least about 2 mg, at least about 5 mg, at least about 10 mg, at least about 15 mg, at least about 20 mg, at least about 30 mg, at least about 35 mg, or at least about 40 mg per 30 g serving of the chocolate composition). In some variations, the chocolate composition comprises (+)-catechin in an amount of at least about 0.01 mg/g of the chocolate composition after defatting (e.g., at least about 0.01 mg/g, at least about 0.05 mg/g, at least about 0.1 mg/g, at least about 0.2 mg/g, at least about 0.3 mg/g, at least about 0.4 mg/g, at least about 0.5 mg/g, at least about 0.6 mg/g, or at least about 0.7 mg/g of the chocolate composition after defatting). In certain variations, the chocolate composition comprises (+)-catechin in an amount of at least 0.5 mg per 30 g serving of the chocolate composition (e.g., at least about 0.5 mg, at least about 1 mg, at least about 2.5 mg, at least about 5 mg, at least about 7.5 mg, at least about 10 mg, at least about 12.5 mg, or at least about 15 mg per 30 g serving of the chocolate composition). In some variations, the chocolate composition comprises (−)-catechin in an amount of at least about 0.01 mg/g of the chocolate composition after defatting (e.g., at least about 0.01 mg/g, at least about 0.05 mg/g, at least about 0.1 mg/g, at least about 0.15 mg/g, at least about 0.2 mg/g, or at least about 0.25 mg/g of the chocolate composition after defatting). In certain variations, the chocolate composition comprises (−)-catechin in an amount of at least 0.1 mg per 30 g serving of the chocolate composition (e.g., at least about 0.1 mg, at least about 0.5 mg, at least about 1 mg, at least about 1.5 mg, at least about 2 mg, at least about 2.5 mg, at least about 3 mg, at least about 3.5 mg, or at least about 4 mg per 30 g serving of the chocolate composition).

In some embodiments, the chocolate composition comprises cocoa flavanols and procyanidins. Cocoa flavanols and procyanidins can be described according to their degree of polymerization (DP), with DP1 referring to monomeric flavanols molecules and DP2 or higher referring to oligomeric procyanidins having two or more flavanols moieties. In certain embodiments, the chocolate composition comprises cocoa flavanols and procyanidins of DP1-7 (e.g., DP1, DP2, DP3, DP4, DP5, DP6, DP7, or any combination thereof). In some variations, the chocolate composition comprises DP1, DP2, DP3, DP4, DP5, DP6, or DP7 cocoa flavanols and procyanidins at a concentration of at least about 0.1 mg/g of the chocolate composition after defatting (e.g., at least about 0.1 mg/g, at least about 0.5 mg/g, at least about 1 mg, at least about 1.5 mg/g, at least about 2 mg/g, at least about 2.5 mg/g, at least about 3 mg/g, at least about 3.5 mg/g, or at least about 4 mg/g of the chocolate composition after defatting). In certain embodiments, the chocolate composition comprises a total amount of cocoa flavanols (e.g., DP1-DP7 cocoa flavanols and procyanidins) of at least about 0.5 mg/g of the chocolate composition after defatting (e.g., at least about 0.5 mg/g, at least about 1 mg/g, at least about 2.5 mg/g, at least about 5 mg/g, at least about 7.5 mg/g, at least about 10 mg/g, at least about 12.5 mg/g, or at least about 15 mg/g of the chocolate composition after defatting). In some embodiments, the chocolate composition comprises a total amount cocoa flavanols (e.g., DP1-DP7 cocoa flavanols and procyanidins) of at least about 10 g per 30 g serving of the chocolate composition (e.g., at least about 10 g, at least about 25 g, at least about 50 g, at least about 75 g, at least about 100 g, at least about 125 g, at least about 150 g, at least about 175 g, at least about 200 g, at least about 225 g, or at least about 250 g per 30 g serving of the chocolate composition).

Methods of defatting chocolate compositions and measuring the presence of flavonoids (including flavanols and procyanidins), phenolic acids, and stilbenes are known in the art. An exemplary such method is described in Example 5.

In some embodiments, the chocolate composition has a Casson viscosity of between about 5 Poise and about 30 Poise (e.g., about 5 Poise, about 10 Poise, about 15 Poise, about 20 Poise, about 25 Poise, or about 30 Poise). In certain embodiments, the chocolate composition has a Casson viscosity of between about 10 Poise and about 25 Poise. In certain embodiments, the chocolate composition has a Casson viscosity of between about 15 Poise and about 20 Poise. In some embodiments, the chocolate composition has a Casson yield stress value of between about 30 dyne/cm2 and about 60 dyne/cm2 (e.g., about 30 dyne/cm2, about 35 dyne/cm2, about 40 dyne/cm2, about 45 dyne/cm2, about 50 dyne/cm2, about 55 dyne/cm2, or about 65 dyne/cm2). In certain embodiments, the chocolate composition has a Casson yield stress value of between about 35 dyne/cm2 and about 55 dyne/cm2. In certain embodiments, the chocolate composition has a Casson yield stress value of between about 40 dyne/cm2 and about 50 dyne/cm2. Methods for measuring the viscosity and yield stress of chocolate are well-known in the art and include, for example, the standard National Confectioners Association and Chocolate Manufacturers Association (NCA/CMA) method for fluid chocolate as described in Baker et al. (2006. "Measurement of yield stress in dark chocolate using controlled stress vane method." *Journal of texture studies* 37.6: 655-667).

In certain embodiments, provided is a food composition comprising:
  between 5 and 95 wt % semi-sweet chocolate;
  between 5 and 50 wt % grape marc; and
  between 0.5 and 40 wt % cocoa butter.

In certain embodiments, provided is a food composition comprising:
  between 5 and 95 wt % unsweetened chocolate;
  between 0.5 and 50 wt % grape marc;
  between 1 and 40 wt % sugar;
  between 0.5 and 40 wt % cocoa butter;
  less than 1 wt % emulsifiers and/or stabilizers; and
  less than 1 wt % natural flavors.

In certain embodiments, provided is a food composition comprising:
  between 30 and 45 wt % unsweetened chocolate;
  between 5 and 50 wt % grape marc;
  between 20 and 35 wt % sugar;

between 5 and 25 wt % cocoa butter;
less than 1 wt % emulsifiers and/or stabilizers; and
less than 1 wt % natural flavors.

In certain embodiments, provided is a food composition comprising:
between 5 and 95 wt % dark chocolate;
between 0.5 and 50 wt % grape marc;
between 0 and 40 wt % sugar;
between 0.5 and 40 wt % cocoa butter; and
less than 1 wt % emulsifiers and/or stabilizers.

In certain embodiments, provided is a food composition comprising:
between 60 and 80 wt % dark chocolate;
between 5 and 30 wt % grape marc;
between 0.5 and 5 wt % cocoa butter; and
less than 1 wt % emulsifiers and stabilizers.

In certain embodiments, provided is a food composition comprising:
between 9 and 95 wt % chocolate liquor;
between 0.5 and 50 wt % grape marc;
between 1 and 40 wt % sugar;
between 0.5 and 40 wt % cocoa butter; and
less than 1 wt % emulsifiers and stabilizers.

In certain embodiments, provided is a food composition comprising:
between 30 and 40 wt % chocolate liquor;
between 20 and 30 wt % grape marc;
between 5 and 35 wt % sugar;
between 5 and 35 wt % cocoa butter; and
less than 1 wt % emulsifiers and/or stabilizers.

In certain embodiments, provided is a food composition comprising:
between 5 and 95 wt % high-flavanol chocolate;
between 0.5 and 50 wt % grape marc;
between 0 and 80 wt % semi-sweet chocolate; and
between 0.5 and 40 wt % cocoa butter.

In certain embodiments, provided is a food composition comprising:
between 50 and 70 wt % high-flavanol chocolate;
between 15 and 30 wt % grape marc;
between 0 and 10 wt % semi-sweet chocolate; and
between 1 and 10 wt % cocoa butter.

In certain embodiments, provided is a food composition comprising:
between 5 and 10 wt % high-flavanol chocolate;
between 10 and 25 wt % grape marc;
between 60 and 80 wt % semi-sweet chocolate; and
between 1 and 10 wt % cocoa butter.

In one variation of the foregoing, the grape marc is a Chardonnay marc. In some variations of the foregoing, the grape marc comprises or consists essentially of Chardonnay marc.

In some variations, the food composition has:
(i) less than 1 wt % of stabilizers;
(ii) less than 1 wt % of emulsifiers;
(iii) at least 10 wt % of dietary fiber;
(iv) at least 2 wt % of soluble fiber;
(v) at least 0.5 wt % of dietary phenol;
(vi) at least 0.5 wt % of flavanols;
(vii) fruit complex aromatics at a rating of at least 1.5 or higher, as measured by Spectrum Descriptive Analysis (SDA); for example, using the method described in Example 4 of the present disclosure;
(viii) red fruit aromatics at a rating of at least 1.0 or higher, as measured by SDA; for example, using the method described in Example 4 of the present disclosure;
(ix) cherry cordial aromatics at a rating of at least 1.1 or higher, as measured by SDA; for example, using the method described in Example 4 of the present disclosure;
(x) raisin aromatic at a rating of at least 0.5 or higher, as measured by SDA; for example, using the method described in Example 4 of the present disclosure;
(xi) white raisin aromatics at a rating of at least 0.5 or higher, as measured by SDA; for example, using the method described in Example 4 of the present disclosure;
(xii) dairy complex aromatics at a rating of at least 1.0 or higher, as measured by SDA; for example, using the method described in Example 4 of the present disclosure;
(xiii) dry nonfat milk aromatics at a rating of at least 1.0 or higher, as measured by SDA; for example, using the method described in Example 4 of the present disclosure;
(xiv) sour or acidic flavor notes at a rating of at least 3.0 or higher, as measured by SDA; for example, using the method described in Example 4 of the present disclosure;
(xv) astringency flavor notes at a rating of 4.5 or lower, as measured by SDA; for example, using the method described in Example 4 of the present disclosure;
(xvi) bitter flavor notes at a rating of 2.5 or lower, as measured by SDA; for example, using the method described in Example 4 of the present disclosure;
(xvii) sweet flavor notes at a rating of at least 6.0 or higher, as measured by SDA; for example, using the method described in Example 4 of the present disclosure;
(xviii) fruity or total fruit aromatic attributes at a rating of at least 0.5 or higher (e.g., at least 0.5, at least 1.0, at least 1.5, at least 2.0, or at least 2.5 or higher), as measured using the method described in Examples 7 and 8 of the present disclosure;
(xix) grape aromatic attributes at a rating of at least 1.0 or higher (e.g., at least 1.0, at least 1.5, at least 2.0, or at least 2.5 or higher), as measured using the method described in Example 8 of the present disclosure;
(xx) grape aromatic attributes at a rating of 1.0 or lower (e.g., 1.0 or lower, or 0.5 or lower), as measured using the method described in Example 8 of the present disclosure;
(xxi) blueberry aromatic attributes at a rating of 0.5 or higher (e.g., at least 0.5, at least 1.0, at least 1.5, at least 2.0, or at least 2.5 or higher), as measured using the method described in Example 8 of the present disclosure;
(xxii) pleasant mouthfeel attributes at a rating of at least 1.0 or higher (e.g., at least 1.0, at least 1.5, at least 2.0, or at least 2.5 or higher), as measured using the method described in Examples 7 and 8 of the present disclosure;
(xxiii) bitter taste attributes at a rating of 2.5 or lower (e.g., 2.5 or lower, 2.0 or lower, 1.5 or lower, or 1.0 or lower), as measured using the method described in Examples 7 and 8 of the present disclosure;
(xxiv) sweet taste attributes at a rating of at least 1.0 or higher (e.g., at least 1.0, at least 1.5, at least 2.0, or at least 2.5 or higher), as measured using the method described in Examples 7 and 8 of the present disclosure;
(xxv) sour taste attributes at a rating of at least 0.5 or higher (e.g., at least 0.5, at least 1.0, at least 1.5, at least 2.0, or at least 2.5 or higher), as measured using the method described in Examples 7 and 8 of the present disclosure;
(xxvi) an average shelf life of at least 6 months, at least 10 months, at least 12 months, or at least 18 months, or between 6 months and 24 months;
(xxvii) a total caloric content of less than 560 calories per 100 g;
(xxviii) a total caloric content of less than 500 calories per 100 g;

(xxix) a total caloric content of less than 400 calories per 100 g;

(xxx) a fiber content of at least 10%, at least 15%, or at least 20% by weight, or between 5% and 20% by weight of the total composition;

(xxxi) a sugar content of less than 35%, less than 30%, less than 25%, less than 20%, or less than 15% by weight of the total composition; or (xxxii) a cacao content of at least 60%, at least 65%, at least 70%, at least 75%, at least 80%, at least 85%, at least 90%, or at least 99%, or any combination of the foregoing (i)-(xxiii).

In some variations of the foregoing, the amounts by weight (e.g., "wt %") are based on the weight of the total composition.

In some variations of the foregoing, aromatics and flavors are rated on the Spectrum Descriptive Analysis (SDA) scale ranging from 0 to 15, as described herein. An exemplary method for evaluating aromatics and flavors on the SDA scale is described in Example 4.

In some variations of the foregoing, aromatics and flavors are rated on a scale of 0 to 4 using a sensory evaluation method. For example, in one such method, a group of six panelists of varying ages and genders with 10-20+ years' professional experience in the food or dietary supplement industry are used to determine the sensory attributes of food products (e.g., chocolates) employing a modified quantitative descriptive analysis. At least twelve flavor attributes from three flavor categories may be evaluated including: 1) retronasal aroma (seven attributes; in-mouth), 2) basic taste (four tastes; bitter, sweet, salty, sour); 3) mouthfeel—astringency (pleasant mouthfeel). Exemplary flavor attributes which may be evaluated are shown in Tables 1A-1C. The panelists are asked to taste each food product (e.g., chocolate) and asked to score each flavor attribute on a nine-point scale from 0 to 4, in which 0=not observable, 1=weak intensity, 2=moderate intensity, 3=strong intensity, and 4=extreme intensity (in 0.5 increments). First, the control food product (e.g., chocolate) is evaluated and scored for all twelve flavor attributes. Then, each test food product (e.g., chocolate) is evaluated, and the panelists are asked to score the test food product's flavor attributes in relation to the intensity of the same flavor attribute in the control food product(s). For palate cleansing, breaks are taken in between each flavor evaluation.

TABLE 1A

Seven exemplary aroma attributes (Retronasal-in-mouth).

| Retronasal Aroma | References | Definitions |
| --- | --- | --- |
| Cocoa | Roasted cacao nibs | Aroma associated with roasted cacao nibs |
| Total Fruit | Canned mixed fruit (Dole) | Aroma associated with fruity characteristics |
| Blueberry | Dried blueberries | Aroma associated with blueberries |
| Grape | Grape juice (Welch's) | Aroma associated with grape juice |
| Roasty | Roasted coffee beans | Aroma associated with roasted foods |
| Nutty | Almonds | Aroma associated with nuts |
| Caramelized | Brown sugar | Aroma associated with brown sugar |

TABLE 1B

Four basic tastes.

| Taste | References | Definitions |
| --- | --- | --- |
| Sour | 0.4% citric acid solution | Taste associated with citric acid solution |
| Bitter | 0.02% caffeine solution | Taste associated with caffeine solution |
| Sweet | 6% sucrose solution | Taste associated with sucrose solution |
| Salty | 0.5% NaCl solution | Taste associated with salt solution |

TABLE 1C

Exemplary mouthfeel attribute.

| Mouthfeel | References | Definitions |
| --- | --- | --- |
| Astringency | 0.4% Alum solution | Puckering/drying mouthfeel |

In one embodiment, provided herein is a food composition comprising chocolate and fruit marc, wherein (a) the fruit marc is present in an amount of between about 5% and about 40% by weight of the total composition, or (b) the weight ratio of chocolate to fruit marc is between about 10:1 and about 1:1; and wherein the food composition has: (i) total fruit aromatic attributes at a rating of at least 0.5 or higher on a scale of 0 to 4; (ii) bitter taste attributes at a rating of 2.5 or lower on a scale of 0 to 4; and (iii) sweet taste attributes at a rating of at least 1.0 or higher on a scale of 0 to 4. In some variations of the foregoing, the food composition further has pleasant mouthfeel attributes at a rating of at least 1.0 or higher on a scale of 0 to 4. In some variations of the foregoing, the food composition comprises a total amount of DP1-DP7 cocoa flavanols and procyanidins of at least about 100 mg per 30 g serving of the chocolate composition. In additional variations of the foregoing, the food composition has an average particle size of between 5 microns and 40 microns. In still additional variations of the foregoing, the food composition comprises sugar (e.g., sucrose) in an amount of between 15% and 35% by weight of the total composition. In yet additional variations of the foregoing, the food composition comprises cocoa butter in an amount of between 10% and 35% by weight of the total composition. In certain variations, the aromatic, taste, mouthfeel, and/or flavor attributes of the food composition are rated on a scale of 0 to 4 using a sensory evaluation method described herein (e.g., the sensory evaluation methods describes in Example 7 and Example 8).

In another embodiment, provided herein is a food composition comprising chocolate and berry marc, wherein (a) the berry marc is present in an amount of between about 5% and about 40% by weight of the total composition, or (b) the weight ratio of chocolate to berry marc is between about 10:1 and about 1:1; and wherein the food composition has: (i) total fruit aromatic attributes at a rating of at least 0.5 or higher on a scale of 0 to 4; (ii) bitter taste attributes at a rating of 2.5 or lower on a scale of 0 to 4; and (iii) sweet taste attributes at a rating of at least 1.0 or higher on a scale of 0 to 4. In some variations of the foregoing, the food composition further has pleasant mouthfeel attributes at a rating of at least 1.0 or higher on a scale of 0 to 4. In some variations of the foregoing, the food composition comprises a total amount of DP1-DP7 cocoa flavanols and procyanidins of at least about 100 mg per 30 g serving of the chocolate composition. In additional variations of the foregoing, the food composition has an average particle size of between 5 microns and 40 microns. In still additional variations of the foregoing, the food composition comprises sugar (e.g., sucrose) in an amount of between 15% and 35% by weight of the total composition. In yet additional variations of the foregoing, the food composition comprises cocoa butter in an amount of between 10% and 35% by weight of the total composition. In certain variations, the aromatic, taste, mouthfeel, and/or flavor attributes of the food composition are rated on a scale of 0 to 4 using a sensory evaluation method described herein (e.g., the sensory evaluation methods describes in Example 7 and Example 8).

In another embodiment, provided herein is a food composition comprising chocolate and grape marc, wherein (a) the grape marc is present in an amount of between about 5% and about 40% by weight of the total composition, or (b) the weight ratio of chocolate to grape marc is between about 10:1 and about 1:1; and wherein the food composition has: (i) total fruit aromatic attributes at a rating of at least 0.5 or higher on a scale of 0 to 4; (ii) bitter taste attributes at a rating of 2.5 or lower on a scale of 0 to 4; and (iii) sweet taste attributes at a rating of at least 1.0 or higher on a scale of 0 to 4. In some variations of the foregoing, the food composition further has pleasant mouthfeel attributes at a rating of at least 1.0 or higher on a scale of 0 to 4. In some variations of the foregoing, the food composition comprises a total amount of DP1-DP7 cocoa flavanols and procyanidins of at least about 100 mg per 30 g serving of the chocolate composition. In additional variations of the foregoing, the food composition has an average particle size of between 5 microns and 40 microns. In still additional variations of the foregoing, the food composition comprises sugar (e.g., sucrose) in an amount of between 15% and 35% by weight of the total composition. In yet additional variations of the foregoing, the food composition comprises cocoa butter in an amount of between 10% and 35% by weight of the total composition. In certain variations, the aromatic, taste, mouthfeel, and/or flavor attributes of the food composition are rated on a scale of 0 to 4 using a sensory evaluation method described herein (e.g., the sensory evaluation methods describes in Example 7 and Example 8).

In another embodiment, provided herein is a food composition comprising chocolate and Chardonnay marc, wherein (a) the Chardonnay marc is present in an amount of between about 5% and about 40% by weight of the total composition, or (b) the weight ratio of chocolate to Chardonnay marc is between about 10:1 and about 1:1; and wherein the food composition has: (i) total fruit aromatic attributes at a rating of at least 0.5 or higher on a scale of 0 to 4; (ii) bitter taste attributes at a rating of 1.5 or lower on a scale of 0 to 4; (iii) sweet taste attributes at a rating of at least 1.0 or higher on a scale of 0 to 4. In some variations of the foregoing, the food composition further has pleasant mouthfeel attributes at a rating of at least 1.0 or higher on a scale of 0 to 4. In certain variations of the foregoing, the food composition further has grape aromatic attributes at a rating of 1.0 or lower on a scale of 0 to 4. In some variations of the foregoing, the food composition comprises a total amount of DP1-DP7 cocoa flavanols and procyanidins of at least about 100 mg per 30 g serving of the chocolate composition. In additional variations of the foregoing, the food composition has an average particle size of between 5 microns and 40 microns. In still additional variations of the foregoing, the food composition comprises sugar (e.g., sucrose) in an amount of between 15% and 35% by weight of the total composition. In yet additional variations of the foregoing, the food composition comprises cocoa butter in an amount of between 10% and 35% by weight of the total composition. In certain variations, the aromatic, taste, mouthfeel, and/or flavor attributes of the food composition are rated on a scale of 0 to 4 using a sensory evaluation method described herein (e.g., the sensory evaluation methods describes in Example 7 and Example 8).

In another embodiment, provided herein is a food composition comprising chocolate and Chardonnay marc, wherein (a) the Chardonnay marc is present in an amount of between about 10% and about 20% by weight of the total composition, or (b) the weight ratio of chocolate to Chardonnay marc is between about 6:1 and about 3:1; and wherein the food composition has: (i) total fruit aromatic attributes at a rating of between 1.0 and 2.0 on a scale of 0 to 4; (ii) bitter taste attributes of 1.5 or less on a scale of 0 to 4; (iii) sweet taste attributes at a rating of at least 1.5 or greater on a scale of 0 to 4, and (iv) grape aromatic attributes at a rating of 1.0 or lower on a scale of 0 to 4. In some variations of the foregoing, the food composition further has pleasant mouthfeel attributes at a rating of between 2.0 and 3.5 on a scale of 0 to 4. In some variations of the foregoing, the food composition comprises a total amount of DP1-DP7 cocoa flavanols and procyanidins of at least about 100 mg per 30 g serving of the chocolate composition. In additional variations of the foregoing, the food composition has an average particle size of between 30 microns and 45 microns. In still additional variations of the foregoing, the food composition comprises sugar (e.g., sucrose) in an amount of 30% or lower by weight of the total composition. In yet additional variations of the foregoing, the food composition comprises cocoa butter in an amount of between 25% and 30% by weight of the total composition. In certain variations, the aromatic, taste, mouthfeel, and/or flavor attributes of the food composition are rated on a scale of 0 to 4 using a sensory evaluation method described herein (e.g., the sensory evaluation methods describes in Example 7 and Example 8).

In another embodiment, provided herein is a food composition comprising chocolate and Concord grape marc, wherein (a) the Concord grape marc is present in an amount of between about 10% and about 20% by weight of the total composition, or (b) the weight ratio of chocolate to Concord grape marc is between about 6:1 and about 3:1; and wherein the food composition has: (i) total fruit aromatic attributes at a rating of between 1.5 and 2.5 on a scale of 0 to 4; (ii) bitter taste attributes of 1.5 or less on a scale of 0 to 4; (iii) sweet taste attributes at a rating of at least 1.5 or greater on a scale of 0 to 4, and (iv) has grape aromatic attributes at a rating of between 1.5 and 2.5 on a scale of 0 to 4. In some variations of the foregoing, the food composition further has pleasant mouthfeel attributes at a rating of between 2.0 and 3.0 on a scale of 0 to 4. In some variations of the foregoing, the food composition comprises a total amount of DP1-DP7 cocoa flavanols and procyanidins of at least about 100 mg per 30 g serving of the chocolate composition. In additional variations of the foregoing, the food composition has an average particle size of between 30 microns and 45 microns. In still additional variations of the foregoing, the food composition comprises sugar (e.g., sucrose) in an amount of 30% or lower by weight of the total composition. In yet additional variations of the foregoing, the food composition comprises cocoa butter in an amount of between 25% and 30% by weight of the total composition. In certain variations, the aromatic, taste, mouthfeel, and/or flavor attributes of the food composition are rated on a scale of 0 to 4 using a sensory evaluation method described herein (e.g., the sensory evaluation methods describes in Example 7 and Example 8).

In another embodiment, provided herein is a food composition comprising chocolate and blueberry marc, wherein (a) the blueberry marc is present in an amount of between about 10% and about 20% by weight of the total composition, or (b) the weight ratio of chocolate to blueberry marc is between about 6:1 and about 3:1; and wherein the food composition has: (i) total fruit aromatic attributes at a rating of between 1.5 and 2.5 on a scale of 0 to 4; (ii) bitter taste attributes of 1.5 or less on a scale of 0 to 4; (iii) sweet taste attributes at a rating of at least 1.5 or greater on a scale of 0 to 4; and (iv) blueberry aromatic attributes at a rating of between 1.5 and 2.5 on a scale of 0 to 4. In some variations of the foregoing, the food composition further has pleasant mouthfeel attributes at a rating of between 2.0 and 3.0 on a scale of 0 to 4. In some variations of the foregoing, the food composition comprises a total amount of DP1-DP7 cocoa flavanols and procyanidins of at least about 100 mg per 30 g serving of the chocolate composition. In additional variations of the foregoing, the food composition has an average particle size of between 30 microns and 45 microns. In still additional variations of the foregoing, the food composition comprises sugar (e.g., sucrose) in an amount of 30% or lower by weight of the total composition. In yet additional variations of the foregoing, the food composition comprises cocoa butter in an amount of between 25% and 30% by weight of the total composition. In certain variations, the aromatic, taste, mouthfeel, and/or flavor attributes of the food composition are rated on a scale of 0 to 4 using a sensory evaluation method described herein (e.g., the sensory evaluation methods describes in Example 7 and Example 8).

In another embodiment, provided herein is a food composition comprising chocolate and Chardonnay marc, wherein (a) the Chardonnay marc is present in an amount of between about 10% and about 20% by weight of the total composition, or (b) the weight ratio of chocolate to Chardonnay marc is between about 6:1 and about 3:1; and wherein the food composition has: (i) aromatic attributes comprising fruit complex, brown fruit, raisin, red fruit, or any combination thereof, each independently at a rating of 0.5 or higher on a scale of 0 to 15; (ii) astringency flavor notes at a rating of 5.0 or lower on a scale of 0 to 15; (iii) bitter flavor notes at a rating of 2.5 or lower on a scale of 0 to 15; and (iv) has sweet flavor notes at a rating of between 6.0 and 10.0 on a scale of 0 to 15. In some variations of the foregoing, the food composition further has sour flavor notes at a rating of between about 2.5 and about 4.5 on a scale of 0 to 15. In additional variations of the foregoing, the food composition further has vanillin aromatic notes at a rating of at least 0.5 or higher on a scale of 0 to 15. In yet additional variations of the foregoing, the food composition further has (i) hardness with incisors at a rating of between 9.0 and 13.0 on a scale of 0 to 15; (ii) snap at a rating of between 9.0 and 12.0 on a scale of 0 to 15; (iii) fracturable at a rating of between 5.5 and 8.0 on a scale of 0 to 15; (iv) rate of melt at a rating of between 6.5 and 8.5; and/or (v) chalky mouthcoat at a rating of between 3.0 and 5.0 on a scale of 0 to 15. In some variations of the foregoing, the food composition comprises a total amount of DP1-DP7 cocoa flavanols and procyanidins of at least about 100 mg per 30 g serving of the chocolate composition. In certain variations of the foregoing, the food composition comprises a total amount of DP1-DP7 cocoa flavanols and procyanidins of between 200 mg and 300 mg per 30 g serving of the chocolate composition. In additional variations of the foregoing, the food composition has an average particle size of between 30 microns and 40 microns. In still additional variations of the foregoing, the food composition comprises sugar (e.g., sucrose) in an amount of 30% or lower by weight of the total composition. In yet additional variations of the foregoing, the food composition comprises cocoa butter in an amount of between 15% and 25% by weight of the total composition. In certain variations, the aromatic, taste, mouthfeel, and/or flavor attributes of the food composition are rated on a scale of 0 to 15 using Spectrum Descriptive Analysis as described herein (e.g., Spectrum Descriptive Analysis).

In another embodiment, provided herein is a food composition comprising chocolate and Chardonnay marc, wherein (a) the Chardonnay marc is present in an amount of between about 10% and about 20% by weight of the total composition, or (b) the weight ratio of chocolate to Chardonnay marc is between about 6:1 and about 3:1; and wherein the food composition has: (i) fruity complex notes at a rating of between 2.0 and 3.0 on a scale of 0 to 15; (ii) brown fruit notes at a rating of between 0.5 and 1.0 on a scale of 0 to 15; (iii) raisin notes at a rating of between 0.5 and 1.0 on a scale of 0 to 15; (iv) red fruit notes at a rating of between 1.5 and 2.0 on a scale of 0 to 15; (v) astringency flavor notes at a rating of 5.0 or lower on a scale of 0 to 15; (iii) bitter flavor notes at a rating of 2.5 or lower on a scale of 0 to 15; and (iv) has sweet flavor notes at a rating of between 7.5 and 8.5 on a scale of 0 to 15. In some variations of the foregoing, the food composition further has sour flavor notes at a rating of between about 2.5 and about 3.5 on a scale of 0 to 15. In additional variations of the foregoing, the food composition further has vanillin aromatic notes at a rating of at between 0.5 and 1.5 on a scale of 1 to 15. In yet additional variations of the foregoing, the food composition further has (i) hardness with incisors at a rating of between 9.5 and 11.0 on a scale of 0 to 15; (ii) snap at a rating of between 9.5 and 11.0 on a scale of 0 to 15; (iii) fracturable at a rating of between 5.5 and 6.5 on a scale of 0 to 15; (iv) rate of melt at a rating of between 7.0 and 8.5; and/or (v) chalky mouthcoat at a rating of between 3.5 and 4.5 on a scale of 0 to 15. In some variations of the foregoing, the food composition comprises a total amount of DP1-DP7 cocoa flavanols and procyanidins of between 200 mg and 300 mg per 30 g serving of the chocolate composition. In one variation of the foregoing, the food composition comprises a total amount of DP1-DP7 cocoa flavanols and procyanidins of between 250 mg and 270 mg per 30 g serving of the chocolate composition. In additional variations of the foregoing, the food composition has an average particle size of between 30 microns and 40 microns. In still additional variations of the foregoing, the food composition comprises sugar (e.g., sucrose) in an amount of between about 25% and about 30% by weight of the total composition. In yet additional variations of the foregoing, the food composition comprises cocoa butter in an amount of between 20% and 25% by weight of the total composition. In certain variations, the aromatic, taste, mouthfeel, and/or flavor attributes of the food composition are rated on a scale of 0 to 15 using Spectrum Descriptive Analysis as described herein (e.g., Spectrum Descriptive Analysis).

Sensory Attributes

In some embodiments, the agricultural marc imparts certain sensory attributes to the food composition into which it is incorporated. In further embodiments, the food composition comprising agricultural marc has altered sensory attributes as compared to a food composition lacking agricultural marc.

In some embodiments wherein the food composition is a chocolate composition, the chocolate composition is prepared by incorporating agricultural marc into chocolate base composition, as described herein. In certain embodiments, the chocolate composition comprising agricultural marc has altered sensory attributes as compared to a chocolate composition prepared using the same chocolate base composition and lacking agricultural marc. In some variations, the chocolate composition lacking agricultural marc consists of the same ingredients in the same relative amounts as the chocolate composition comprising the agricultural marc except for its lack of agricultural marc. In certain embodiments, the chocolate composition comprising agricultural marc has increased fruity (e.g., total fruit) aromatic attributes, increased grape aromatic attributes, decreased bitter taste attributes, and/or increased sour taste attributes compared to a chocolate composition produced from the same chocolate base composition and lacking agricultural marc. In some embodiments, which may be combined with the foregoing, the chocolate composition comprising agricultural marc has the same or similar grape aromatic attributes, pleasant mouthfeel attributes, bitter taste attributes, and/or sweet taste attributes compared to a chocolate composition produced from the same chocolate base composition and lacking agricultural marc. Aromatic, mouthfeel, and taste attributes of chocolate may be evaluated by any suitable means known in the art including, for example Spectrum Descriptive Analysis (SDA). Exemplary methods for evaluating aromatic, mouthfeel, and taste attributes of chocolate are described in Examples 4, 7, and 8 of the present disclosure.

In some embodiments, the food composition is a chocolate composition produced from a chocolate base composition, wherein the chocolate composition comprises at least 5% fruit marc (e.g., berry marc) by weight of the total composition (e.g., about 5%, about 10%, about 15%, about 20%, about 25%, about 30%, about 35%, about 40%, or about 45%), and wherein the chocolate composition has increased fruity (e.g., total fruit) aromatic attributes, similar or decreased bitter taste attributes, similar or increased sour taste attributes, similar pleasant mouthfeel attributes, and/or sweet taste attributes compared to a chocolate composition produced from the same chocolate base composition and lacking agricultural marc. In certain embodiments, the food composition is a chocolate composition produced from a chocolate base composition, wherein the chocolate composition comprises fruit marc (e.g., berry marc), wherein the weight ratio of chocolate to fruit marc (e.g., berry marc) is between 25:1 and 1:1 (e.g., between 25:1 and 1:1, between 25:1 and 2:1, 25:1 and 3:1, between 10:1 and 1:1, between 10:1 and 2:1, between 10:1 and 3:1), and wherein the chocolate composition has increased fruity (e.g., total fruit) aromatic attributes, similar or decreased bitter taste attributes, similar or increased sour taste attributes, similar pleasant mouthfeel attributes, and/or similar sweet taste attributes compared to a chocolate composition produced from the same chocolate base composition and lacking agricultural marc.

In some embodiments, the food composition is a chocolate composition produced from a chocolate base composition, wherein the chocolate composition comprises at least 5% grape marc by weight of the total composition (e.g., about 5%, about 10%, about 15%, about 20%, about 25%, about 30%, about 35%, about 40%, or about 45%), and wherein the chocolate composition has increased fruity (e.g., total fruit) aromatic attributes, similar or increased grape aromatic attributes, similar or decreased bitter taste attributes, increased sour taste attributes, similar pleasant mouthfeel attributes, and/or similar sweet taste attributes compared to a chocolate composition produced from the same chocolate base composition and lacking grape marc. In certain embodiments, the food composition is a chocolate composition produced from a chocolate base composition, wherein the chocolate composition comprises grape marc, wherein the weight ratio of chocolate to grape marc is between 25:1 and 1:1 (e.g., between 25:1 and 1:1, between 25:1 and 2:1, 25:1 and 3:1, between 10:1 and 1:1, between 10:1 and 2:1, between 10:1 and 3:1), and wherein the chocolate composition has increased fruity (e.g., total fruit) aromatic attributes, similar or increased grape aromatic attributes, similar or decreased bitter taste attributes, or increased sour taste attributes, similar pleasant mouthfeel attributes, and/or similar sweet taste attributes compared to a chocolate composition produced from the same chocolate base composition and lacking grape marc.

In some embodiments, the food composition is a chocolate composition produced from a chocolate base composition, wherein the chocolate composition comprises at least 5% Chardonnay marc by weight of the total composition (e.g., about 5%, about 10%, about 15%, about 20%, about 25%, about 30%, about 35%, about 40%, or about 45%), and wherein the chocolate composition has increased fruity (e.g., total fruit) aromatic attributes, similar grape aromatic attributes, decreased bitter taste attributes, increased sour taste attributes, similar pleasant mouthfeel attributes, and/or similar sweet taste attributes compared to a chocolate composition produced from the same chocolate base composition and lacking Chardonnay marc. In one embodiment, the food composition is a chocolate composition produced from a chocolate base composition, wherein the chocolate composition comprises about 15% Chardonnay marc by weight of the total composition, and wherein the chocolate composition has increased fruity (e.g., total fruit) aromatic attributes, similar grape aromatic attributes, decreased bitter taste attributes, increased sour taste attributes, similar pleasant mouthfeel attributes, and similar sweet taste attributes compared to a chocolate composition produced from the same chocolate base composition and lacking Chardonnay marc. In certain embodiments, the food composition is a chocolate composition produced from a chocolate base composition, wherein the chocolate composition comprises Chardonnay marc, wherein the weight ratio of chocolate to Chardonnay marc is between 25:1 and 1:1 (e.g., between 25:1 and 1:1, between 25:1 and 2:1, 25:1 and 3:1, between 10:1 and 1:1, between 10:1 and 2:1, between 10:1 and 3:1, between 6:1 and 3:1, or between 6:1 and 4:1), and wherein the chocolate composition has increased fruity (e.g., total fruit) aromatic attributes, similar grape aromatic attributes, decreased bitter taste attributes, increased sour taste attributes, similar pleasant mouthfeel attributes, and/or similar sweet taste attributes compared to a chocolate composition produced from the same chocolate base composition and lacking Chardonnay marc. In one embodiment, the food composition is a chocolate composition produced from a chocolate base composition, wherein the chocolate composition comprises Chardonnay marc, wherein the weight ratio of chocolate to Chardonnay marc is between 10:1 and 3:1, and wherein the chocolate composition has increased fruity (e.g., total fruit) aromatic attributes, decreased bitter taste attributes, increased sour taste attributes, similar pleasant mouthfeel attributes, and similar sweet taste attributes compared to a chocolate composition produced from the same chocolate base composition and lacking Chardonnay marc.

In some embodiments, the food composition is a chocolate composition produced from a chocolate base composition, wherein the chocolate composition comprises at least 5% Concord grape marc by weight of the total composition (e.g., about 5%, about 10%, about 15%, about 20%, about 25%, about 30%, about 35%, about 40%, or about 45%), and wherein the chocolate composition has increased fruity (e.g., total fruit) aromatic attributes, increased grape aromatic attributes, similar bitter taste attributes, increased sour taste attributes, similar pleasant mouthfeel attributes, and/or similar sweet taste attributes compared to a chocolate composition produced from the same chocolate base composition and lacking Concord grape marc. In one embodiment, the food composition is a chocolate composition produced from a chocolate base composition, wherein the chocolate composition comprises about 15% Concord grape marc by weight of the total composition, and wherein the chocolate composition has increased fruity (e.g., total fruit) aromatic attributes, increased grape aromatic attributes, similar bitter taste attributes, increased sour taste attributes, similar pleasant mouthfeel attributes, and similar sweet taste attributes compared to a chocolate composition produced from the same chocolate base composition and lacking Concord grape marc. In certain embodiments, the food composition is a chocolate composition produced from a chocolate base composition, wherein the chocolate composition comprises Concord grape marc, wherein the weight ratio of chocolate to Concord grape marc is between 25:1 and 1:1 (e.g., between 25:1 and 1:1, between 25:1 and 2:1, 25:1 and 3:1, between 10:1 and 1:1, between 10:1 and 2:1, between 10:1 and 3:1, between 6:1 and 3:1, or between 6:1 and 4:1), and wherein the chocolate composition has increased fruity (e.g., total fruit) aromatic attributes, increased grape aromatic attributes, similar bitter taste attributes, increased sour taste attributes, similar pleasant mouthfeel attributes, and/or similar sweet taste attributes compared to a chocolate composition produced from the same chocolate base composition and lacking Concord grape marc. In one embodiment, the food composition is a chocolate composition produced from a chocolate base composition, wherein the chocolate composition comprises Concord grape marc, wherein the weight ratio of chocolate to Concord grape marc is between 6:1 and 4:1, and wherein the chocolate composition has increased fruity (e.g., total fruit) aromatic attributes, increased grape aromatic attributes, similar bitter taste attributes, increased sour taste attributes, similar pleasant mouthfeel attributes, and similar sweet taste attributes compared to a chocolate composition produced from the same chocolate base composition and lacking Concord grape marc.

In some embodiments, the food composition is a chocolate composition produced from a chocolate base composition, wherein the chocolate composition comprises at least 5% blueberry marc by weight of the total composition (e.g., about 5%, about 10%, about 15%, about 20%, about 25%, about 30%, about 35%, about 40%, or about 45%), and wherein the chocolate composition has increased fruity (e.g., total fruit) aromatic attributes, increased blueberry aromatic attributes, similar bitter taste attributes, increased sour taste attributes, similar pleasant mouthfeel attributes, and/or similar sweet taste attributes compared to a chocolate composition produced from the same chocolate base composition and lacking blueberry marc. In one embodiment, the food composition is a chocolate composition produced from a chocolate base composition, wherein the chocolate composition comprises about 15% blueberry marc by weight of the total composition, and wherein the chocolate composition has increased fruity (e.g., total fruit) aromatic attributes, increased blueberry aromatic attributes, similar bitter taste attributes, increased sour taste attributes, similar pleasant mouthfeel attributes, and similar sweet taste attributes compared to a chocolate composition produced from the same chocolate base composition and lacking blueberry marc. In certain embodiments, the food composition is a chocolate composition produced from a chocolate base composition, wherein the chocolate composition comprises blueberry marc, wherein the weight ratio of chocolate to blueberry marc is between 25:1 and 1:1 (e.g., between 25:1 and 1:1, between 25:1 and 2:1, 25:1 and 3:1, between 10:1 and 1:1, between 10:1 and 2:1, between 10:1 and 3:1, between 6:1 and 3:1, or between 6:1 and 4:1), and wherein the chocolate composition has increased fruity (e.g., total fruit) aromatic attributes, increased blueberry aromatic attributes, similar bitter taste attributes, increased sour taste attributes, similar pleasant mouthfeel attributes, and/or similar sweet taste attributes compared to a chocolate composition produced from the same chocolate base composition and lacking blueberry marc. In one embodiment, the food composition is a chocolate composition produced from a chocolate base composition, wherein the chocolate composition comprises blueberry marc, wherein the weight ratio of chocolate to blueberry marc is between 6:1 and 4:1, and wherein the chocolate composition has increased fruity (e.g., total fruit) aromatic attributes, increased blueberry aromatic attributes, similar bitter taste attributes, increased sour taste attributes, similar pleasant mouthfeel attributes, and similar sweet taste attributes compared to a chocolate composition produced from the same chocolate base composition and lacking blueberry marc.

Methods to Manufacture the Food Compositions

In other aspects, provided are methods for preparing the food compositions described herein that incorporate agricultural marc. In some embodiments, the method comprises combining an agricultural marc with a base composition. In some variations, the agricultural marc may be mixed into a base food composition. In other variations, the agricultural marc may be combined with one or more ingredients of the base food composition.

For example, in the context of chocolate production, in one variation, agricultural marc may be incorporated to a chocolate base composition that already comprises one or more of unsweetened chocolate, sugar, cocoa butter, and other ingredients mixed together. In such variation, the chocolate base composition serves as a base starting material for the chocolate production process. In certain variations, the chocolate base composition comprises a composition derived from cacao beans, with or without cocoa butter. In certain variations, the chocolate base composition may be a powder, a liquid, an oil, a fat, or an emulsion. In some embodiments, the chocolate base composition may include one or more of cocoa powder, cocoa butter, melted chocolate, chocolate liquor, melted semi-sweet chocolate, melted dark chocolate, or melted high-flavanol chocolate.

In another variation, agricultural marc may be combined with one or more of cocoa powder, cocoa butter, melted chocolate, chocolate liquor, melted semi-sweet chocolate, melted dark chocolate, or melted high-flavanol chocolate, as well as any of the additional ingredients described herein (e.g., sugar, flavorings, etc.)

In certain embodiments, agricultural marc is incorporated into a chocolate base composition in the form of a powder, including having any of particle sizes and other properties described herein. In certain embodiments, the agricultural marc powder is homogenously incorporated. In some variations, the agricultural marc powder may be incorporated into the chocolate base composition in a dry or wet format. In some variations, the chocolate base composition may be further homogenized after the addition of agricultural marc powder. For example, the chocolate base composition incorporating the agricultural marc powder may be passed through a roller refiner. In some variations, the chocolate composition may be tempered and formed into bars. In other variations, the chocolate composition may be shaped or formed into a variety of conformations and shapes.

EXAMPLES

The presently disclosed subject matter will be better understood by reference to the following Examples, which are provided as exemplary of the invention, and not by way of limitation.

Example 1: Processing of Chardonnay Marc

This Example depicts an exemplary method used to process Chardonnay grapes into a marc ingredient suitable for incorporation into chocolate.

Chardonnay marc was produced in a juice production process. The marc was cleaned by removing residual stems, leaves, stones, and metal. The marc was then rinsed with clean water and then pressed to remove most of the water. The resulting marc was dried and then dry-milled to achieve an average particle size of around 100 microns. The resulting Chardonnay marc powder was incorporated into the food compositions described in Examples 2 and 3.

Example 2: Batch Production and Characterization of Chocolate Bars Containing Chardonnay Marc The Chardonnay marc produced in Example 1 was used to prepare several batches of chocolate with Chardonnay marc. These batches were analyzed for their flavor, mouthfeel, and nutritional content.

Semi-Sweet Chocolates Containing Chardonnay Marc

Several semi-sweet chocolate bars containing varying amounts of Chardonnay marc were produced. Initial efforts were focused in on the usage rate of the marc in chocolate. Three different usage rates were chosen for the initial testing: 8%, 15%, and 25%. First, semi-sweet chocolate was melted in a microwave and mixed with a roughly equal amount of Chardonnay marc, which was incorporated into the melted chocolate to create a paste. This paste was refined using a roller refiner. In the first pass, it was passed through at 400-450 psi, resulting in a mixture with an average particle size of 25-35 microns. In the second pass, it was subjected to 450-475 psi, resulting in a mixture with an average particle size of 15-17 microns. Melted cocoa butter and lecithin were then added to the refined chocolate and marc mixture, and the mixture was mixed on a mixer with a heated mantle until fully homogenous to create a base chocolate-marc mixture. Table 2 outlines the ingredient makeup of this base chocolate-marc mixture.

TABLE 2

Ingredient makeup of the base chocolate-marc mixture.

| Ingredient | % | Amount (g) |
| --- | --- | --- |
| Semi-Sweet Chocolate | 45% | 1020.4 |
| Marc | 50% | 1135.0 |
| Cocoa Butter | 5% | 113.5 |
| Lecithin | <1% | 1.1 |
| Total | 100% | 2270.0 |

This high of concentration of marc was not appropriate as an eating chocolate without dilution. Therefore, the base chocolate-marc mixture was then used to create semi-sweet chocolate bars containing 8%, 15%, and 25% Chardonnay marc, with or without the addition of vanilla. First, the chocolate-marc mixture was melted down and mixed in the appropriate ratio with semi-sweet chocolate, and vanilla was added as appropriate. This mixture was then tempered and molded into bars. The bars were analyzed for nutritional content and tasted for mouthfeel and flavor. Table 3 shows the ingredient makeup of the resulting chocolate bars.

TABLE 3

Ingredient makeup of the 8%, 15%, and 25% Chardonnay marc semi-sweet chocolates.

| Ingredient | 25% Marc | 25% Marc with Vanilla | 15% Marc | 15% Marc with Vanilla | 8% Marc | 8% Marc with Vanilla |
| --- | --- | --- | --- | --- | --- | --- |
| Marc | 25.0% | 25.0% | 15.0% | 15.0% | 8.0% | 8.0% |
| Semi-Sweet Chocolate | 72.3% | 72.2% | 83.5% | 83.4% | 91.2% | 91.1% |
| Cocoa Butter | 2.5% | 2.5% | 1.5% | 1.5% | 0.8% | 0.8% |
| Lecithin | <1% | <1% | <1% | <1% | <1% | <1% |
| Vanilla | | <1% | | <1% | | <1% |
| Total | 100% | 100% | 100% | 100% | 100% | 100% |
| Sugar per Serving* | | 14 g | | 13 g | | 12 g |

*One serving is 28 grams.

Dark Chocolates Containing Chardonnay Marc

Dark chocolate bars containing 25% Chardonnay marc were produced. First, dark chocolate was melted in a microwave and mixed with Chardonnay marc at a roughly 3:1 ratio of chocolate to marc. The marc was fully incorporated into the melted chocolate to create a paste. This paste was refined using a roller refiner. In the first pass, it was passed through at 400-450 psi, resulting in a mixture with an average particle size of 25-35 microns. In the second pass, it was subjected to 450-475 psi, resulting in a mixture with an average particle size of 15-17 microns. Melted cocoa butter and lecithin were then added to the refined chocolate and marc mixture, and the mixture was mixed on a mixer with a heated mantle until fully homogenous. The chocolate was then transfer a melted where it stayed for 24 hours at 100-115° F. The chocolate was then tempered and molded into bars. Table 4 shows the ingredient makeup of the resulting chocolate bars. The dark chocolate bars with marc were observed to have the good sweetness, a slightly gummy mouth feel with some tart and tannin notes, but fewer tart notes than the semi-sweet chocolates.

TABLE 4

Ingredient makeup of 25% Chardonnay marc dark chocolate.

| Ingredient | % | Amount (g) |
|---|---|---|
| Dark Chocolate | 73.1% | 731.0 |
| Marc | 24.4% | 243.7 |
| Cocoa Butter | 2.5% | 24.8 |
| Soy Lecithin | <1% | 0.5 |
| Total | 100% | 1000.0 |

Chocolates Containing Chardonnay Marc Made from Chocolate Liquor

Chocolate bars containing 25% Chardonnay marc were produced from scratch using chocolate liquor. First, chocolate liquor was melted in a microwave and mixed with Chardonnay marc at a roughly 3:1 ratio of chocolate to marc. The marc was fully incorporated into the melted chocolate to create a paste. This paste was refined using a roller refiner as described above. The particle size of the scratch chocolate mixture with marc was measured by micrometer after 1:1 dilution of the chocolate in mineral oil. Melted cocoa butter, sugar, and lecithin were then added to the refined chocolate and marc mixture, and the mixture was mixed on a mixer with a heated mantle until fully homogenous. One batch of the chocolate was run through a conche for 48 hours at 105-115° F. ("Conched Chocolate") while another was not ("Scratch Chocolate"). The chocolate was then tempered and molded into bars.

Table 5 shows the ingredient makeup and particle sizes of the Scratch and Conched Chocolate bars. The Scratch Chocolate bars were observed to have improved flavor and texture over the semi-sweet and dark chocolates with marc, including good sweetness, a less gummy mouth feel and fewer harsh acidic notes. The Scratch Chocolate did retain some grittiness. The Conched Chocolate was further improved over the Scratch Chocolate, with less grit, more round flavor, and no harsh notes, though it retained some gumminess.

TABLE 5

Ingredient makeup of 25% Chardonnay marc Scratch and Conched Chocolates.

| | Scratch | | Conched | |
|---|---|---|---|---|
| Ingredient | % | Amount (g) | % | Amount (g) |
| Chocolate Liquor | 35% | 175.0 | 35% | 175.0 |
| Marc | 25% | 125.0 | 25% | 125.0 |
| Cocoa Butter | 10% | 50.0 | 10% | 50.0 |

TABLE 5-continued

Ingredient makeup of 25% Chardonnay marc Scratch and Conched Chocolates.

| | Scratch | | Conched | |
|---|---|---|---|---|
| Ingredient | % | Amount (g) | % | Amount (g) |
| Sugar | 30% | 149.8 | 30% | 150.0 |
| Lecithin | <1% | 2.5 | <1% | 0.3 |
| Total | 100% | 502.3 | 100% | 500.3 |
| Sugar per Serving* | | 9 g | | |
| Particle Size | | 19.6 micron | | Not measured |

*One serving is 28 grams.

Reduced Sugar Chocolate Containing Chardonnay Marc

Reduced sugar chocolate bars containing 25% Chardonnay marc were produced using chocolate liquor and allulose using the same method as described above in "Chocolates Containing Chardonnay Marc Made from Chocolate Liquor", except the method was modified to use a 1:1 ratio of chocolate liquor to marc and sugar and allulose were added before the roller refining step. The reduced sugar chocolate was not run through a conche. Table 6 shows the ingredient makeup and particle size of the resulting reduced-sugar bars. The reduced sugar bars were found to have the same quality as the Scratch Chocolate bars, including good sweetness without the need for additional sweeteners.

TABLE 6

Ingredient makeup of reduced sugar Chardonnay marc chocolate.

| Ingredient | % | Amount (g) |
|---|---|---|
| Chocolate Liquor | 30% | 150.0 |
| Marc | 25% | 125.0 |
| Cocoa Butter | 10% | 50.0 |
| Sugar | 20% | 100.0 |
| Allulose | 15% | 75.0 |
| Lecithin | <1% | 2.5 |
| Total | 100% | 502.5 |
| Sugar per Serving* | | 6 g |
| Particle Size | | 20.6 micron |

*One serving is 28 grams.

High-Flavanol Chocolate Containing Chardonnay Marc

High-flavanol chocolate bars containing Chardonnay marc were also produced. One batch ("Flavanol-Enhanced Chocolate") was produced using the same method as described in "Chocolates Containing Chardonnay Marc Made from Chocolate Liquor", except that a high-flavanol chocolate was used as a base instead of chocolate liquor, and no sugar or lecithin was added. Another batch was formulated to contain 250 mg flavanols per 28 g serving ("250 mg Flavanol Chocolate") using the same method as for Flavanol-Enhanced Chocolate, except that semi-sweet chocolate was melted and mixed into the marc-containing chocolate along with the cocoa butter and lecithin. Table 7 shows the ingredient makeup and particle size of the resulting flavanol-enhanced bars.

TABLE 7

Ingredient makeup of flavanol-enhanced marc chocolates.

| Ingredient | Flavanol-Enhanced % | Amount (g) | 250 mg Flavanol % | Amount (g) |
|---|---|---|---|---|
| High-Flavanol Chocolate Base | 68% | 425.0 | 67% | 418.8 |
| Marc | 25% | 156.2 | 20% | 125.0 |
| Cocoa Butter | 7% | 43.8 | 5% | 31.2 |
| Semi-Sweet Chocolate | 0% | 0.0 | 8% | 50.0 |
| Total | 100% | 625.0 | 100% | 625.0 |
| Particle Size | | 14.6 micron | | Not measured |

Chocolate with 20% Chardonnay Marc

Semi-sweet chocolate bars with 20% Chardonnay marc was used to test mouth feel. The bars were produced using the method as described in "Dark Chocolate Containing Chardonnay Marc" except that semi-sweet chocolate was used as the base, high-flavanol chocolate was added after incorporation of the marc, and the chocolate was not allowed to sit in a melter before tempering and molding. Table 8 shows the ingredient makeup of the resulting 20% Chardonnay marc semi-sweet bars.

TABLE 8

Ingredient makeup of 20% Chardonnay marc semi-sweet chocolate bars.

| Ingredient | % | Amount (g) |
|---|---|---|
| High-Flavanol Chocolate Base | 8% | 50.0 |
| Marc | 20% | 125.0 |
| Cocoa Butter | 5% | 31.2 |
| Semi-Sweet Chocolate | 67% | 418.8 |
| Total | 100% | 625.0 |
| Sugar per Serving* | | 10 g |

*One serving is 28 grams.

Example 3: Production of Prototype Chocolates Containing 15% Chardonnay Marc

Four prototype batches of chocolate containing 15% Chardonnay marc were produced. Table 9 shows their ingredient makeup.

TABLE 9

Ingredient formulas for prototype chocolates containing 15% Chardonnay marc.

| Ingredient | Batch 1 | Batch 2 | Batch 3 | Batch 4 |
|---|---|---|---|---|
| Unsweetened Chocolate | 38.5% | 42.5% | 39.5% | 35.5% |
| Sugar | 31.5% | 25.0% | 25.0% | 27.0% |
| Cocoa Butter | 14.5% | 17.0% | 20.0% | 22.0% |
| Chardonnay Marc | 15.0% | 15.0% | 15.0% | 15.0% |
| Soy Lecithin | <1% | <1% | <1% | <1% |
| Natural Flavor | <1% | <1% | <1% | <1% |
| Total | 100% | 100% | 100% | 100% |
| Sugar per Serving | 10.1 g | 8.2 g | 8.2 g | 8.8 g |
| Fiber per Serving | 3.8 g | 4.2 g | 4.1 g | 3.9 g |
| Minimum Cacao Content | 60% | 67% | 67% | 67% |

*One serving is 30 grams.

Example 4: Sensory Features of Chocolate Containing 15% Chardonnay Marc

The Batch 1 and Batch 4 prototype chocolate bars produced in Example 3 were each tested in a sensory panel to evaluate their sensory characteristics. Flavor and texture characteristics of each sample were documented to understand similarities and differences of the test products compared to the control space of available market products.

Spectrum Descriptive Analysis Method

The chocolates were evaluated using Spectrum Descriptive Analysis (SDA). In SDA, detailed lexicons with physical and chemical descriptors are used to discriminate among samples and document each sample with its unique flavor and texture Spectrum. SDA uses standard rating scales for intensity that provides highly reproducible data over time and panelists. Attribute Spectrums are developed for each product. The strength of each attribute is rated on a 0-15 scale with 0=none and 15=very strong. This scale incorporates the ability to use tenths of a point and therefore has the potential of 151 scale differentiations. Tables 10A and 10B define the flavor and texture attributes used in SDA.

TABLE 10A

Description of flavor attributes used in SDA.

| ATTRIBUTE | DESCRIPTION |
|---|---|
| AROMATICS | |
| Total Intensity | The total of all aromatics intensities associated with the sample. |
| Overall Chocolate Impression | The aromatics associated with the total impact of chocolate including the individual components. |
| Chocolate Essence | The aromatics associated with the cacao beans appropriately fermented and roasted to develop full flavor, typified by high quality roasted West African beans. |
| Cocoa | The aromatics associated with cocoa powder, including some burlap and woody notes. |
| Alkalized Cocoa | The aromatics associated with cocoa that has been processed with alkali |
| Dark Roast | The aromatics associated with a sample that has been dark roasted but not burnt, like peanuts. |

TABLE 10A-continued

Description of flavor attributes used in SDA.

| ATTRIBUTE | DESCRIPTION |
|---|---|
| Dairy Complex | The aromatics associated with the total dairy impact and may include different types of dairy and different processes. |
| Cooked Milk | The aromatics associated with heated milk. |
| Nonfat Dry Milk | The aromatics associated with dry non-fat milk solids, whey protein and heated milk. This attribute accounts for much of the "powdered" dairy note such as "Powdered cheddar" and "powdered milk". |
| Developed Milk | The aromatics associated with butyric acid or soured dairy products |
| Butter Fat | The aromatics associated with butterfat. |
| Sweet Aromatics | The aromatics associated with products which also smell sweet such as honey, maple syrup, brown sugar, and vanilla. |
| Vanilla Complex | The total aromatics associated with vanilla bean and vanillin crystals, reminiscent of marshmallows. |
| Vanilla | The aromatics associated with vanilla beans; a blend of sweet, vanillin, woody, and browned notes |
| Vanillin | The aromatics associated with vanillin crystals, reminiscent of marshmallows. |
| Caramelized | The aromatics associated with sugars and or carbohydrates which have been heated to the point of being browned or caramelized. |
| Lactone | The aromatics associated with lactone, it is a main component of artificial coconut flavor and is sometimes found in artificial butter or vanilla flavors. |
| Fruity Complex | The total aromatics associated with fruit |
| Brown Fruit | The aromatics associated with the general category of brown fruit including raisins, prunes, figs, etc. |
| Raisin | The aromatics associated with dried fruits, especially raisin. |
| Fig | The aromatics associated with dried fruits, especially fig. |
| Red Fruit | The aromatics associated with red fruits such as raspberry and cherry. |
| Stone Fruit | The aromatics associated with stone fruits including apples, pears and peaches. Also includes green grapes. |
| Citrus | The aromatics associated with citrus notes such as orange, lemon, lime, and grapefruit. |
| Nutty | The aromatics associated with a nutty/woody flavor; also a characteristic of walnuts and other nuts. |
| Winey | The aromatics associated with fruity wines. |
| Woody | The aromatics associated with the general category of wood. |
| Brown Spice | The aromatics associated with the general category of brown spices and may include cinnamon, clove, nutmeg, ginger, etc. |
| Fermented | The aromatics associated with the fermentation of vegetable matter, alcohol fermentation, or fermented grains. |
| BASICS | |
| Sweet | The taste on the tongue associated with sugars and high potency sweeteners |
| Sour | The taste on the tongue stimulated by acid, such as citric, malic, phosphoric, etc. |
| Salt | The taste on the tongue associated with sodium and other salts. |
| Bitter | The taste on the tongue associated with caffeine and other bitter substances, such as quinine and hop bitters. |
| CHEMICAL FEELING FACTORS | |
| Astringent | The shrinking or puckering of the tongue surface caused by substances such as tannins or alum. |

TABLE 10B

Descriptions of texture attributes used in SDA.
TEXTURE

| ATTRIBUTE | DESCRIPTION |
|---|---|
| First Chew | |
| Hardness with incisors | The amount force required to bite through with incisors |
| Snap | The force with which the sample breaks |
| Fracturable | The force with which the sample breaks |
| Chewdown | |
| Moistness of Mass | The amount of wetness/oiliness/moisture on the surface of the chewed mass. |
| Cohesiveness of Mass | The degree to which the sample holds together in a mass. |

TABLE 10B-continued

Descriptions of texture attributes used in SDA.
TEXTURE

| ATTRIBUTE | DESCRIPTION |
|---|---|
| Grit between teeth | The amount of gritty particles perceived between the teeth [None to Many] |
| Adhesive to Palate | Force required to remove the sample from the palate using the tongue |
| Roughness Of Mass | The roughness/graininess/lumpiness or amount of particles in the mass. |
| Lumpy | The degree to which the mass feels lumpy (large, rounded particles). |
| Coarse | The degree to which the mass feels coarse (large, rough, uneven particles). |
| Gritty | Degree to which the product makes the mouth feel gritty, grainy, sandy, or dirty. |
| Grainy | The degree to which the mass feels grainy (small, rounded particles). |
| Rate of Melt | The rate at which the sample melts during chew and/or manipulation |

Residual

| Toothpack/Toothstick | The amount of product left in the crevices of the teeth after expectoration |
|---|---|
| Oily/Greasy Mouthcoat | The amount of oil/grease coating mouth surfaces. |
| Sticky/tacky Mouthcoat | The amount of sticky/tacky coating felt on the surfaces of the mouth after expectoration. |
| Chalky Mouthcoat | The amount of chalky particles on the palate. [None to Extreme] |
| Residual particles | The amount of particles remaining in the mouth after expectoration. |

The samples were analyzed for flavor and texture by members of the Sensory Spectrum Food Panel, trained and experienced in each type of evaluation, using the SDA method described above. Prior to the first evaluation, the panel was oriented to the project and reviewed attribute references. The panelists evaluated each sample using the following procedure. Each panelist received 9 pieces (approximately 1 square inch) of chocolate to evaluate for flavor, and texture. Panelists recorded individual ratings, then each attribute was discussed until a consensus value was decided upon and recorded. All samples were expectorated. Additional samples were provided to the panelists, if needed. This process was repeated for each sample.

Batch 1 Prototype Chocolate Sensory Panel

Tables 11A-C show the results of the sensory panel evaluating the Batch 1 prototypes produced in Example 3. The highlights of these results are shown in FIG. 1. Briefly, the prototype was noticeably different from the controls in terms of flavor, most notably in chocolate impact and fruity aromatics. The prototype and the Control 4 exhibited a lower chocolate essence which resulted in lower overall chocolate impression than the Controls 1-3. The prototype and Control 4 also have cocoa aromatic, dairy complex, vanillin, and nutty aromatics. The prototype had a raisin aromatic, characterized as white raisin, which was not present in the other samples. Surprisingly, the prototype exhibited a red fruit aromatic. The red fruit note in the prototype was characterized as cherry cordial, whereas Control 4 had a non-specific red fruit note. The nutty note in the prototype was characterized as old peanut, while the nutty note in Control 4 was characterized as general nutty. The dairy complex note in the prototype was characterized as nonfat dry milk, while the dairy complex note in Control 4 was characterized as cooked milk. There was no red fruit perceived in Controls 1-3. The prototype also lacked the dark roast aromatic but exhibited a nonfat dry milk aromatic not perceived in the controls. The prototype also exhibited a higher sour basic taste and a marginally higher salty flavor than the controls. Compared to Controls 1-3, both the prototype and Control 4 tasted less bitter. The decreased bitterness in the prototype was surprising in view of the use of Chardonnay marc. In terms of texture, the prototype was similar to Control 4 but distinct from Controls 1-3 in first chew attributes and rate of melt. A residual chalky mouthcoat was perceived with the prototype. Compared to Controls 1-3, both the prototype and Control 4 were softer, had lower snap, and were less fracturable on first chew. In chewdown, the mass of the prototype and Control 4 lacked coarse and had a higher rate of melt.

TABLE 11A

Aromatic flavor characteristics of chocolate with and without Chardonnay marc.

|  | CONTROL 1 | CONTROL 2 | CONTROL 3 | CONTROL 4 | PROTOTYPE Batch 1 |
|---|---|---|---|---|---|
| Total Intensity | 8.0 | 8.8 | 8.5 | 8.0 | 7.5 |
| Overall Chocolate Impression | 5.0 | 5.8 | 5.3 | 4.0 | 3.3 |
| Chocolate Essence | 5.0 | 4.8 | 5.3 | 2.0 | 1.0 |
| Cocoa | 0.0 | 0.0 | 0.0 | 2.0 | 2.5 |
| Alkalized Cocoa | 0.0 | 1.0 | 0.0 | 0.0 | 0.0 |
| Dark Roast | 1.5 | 2.5 | 2.3 | 1.0 | 0.0 |
| Dairy Complex | 0.0 | 0.0 | 0.0 | 1.3 | 1.5 |
| Cooked Milk | 0.0 | 0.0 | 0.0 | 1.3 | 0.0 |
| Nonfat Dry Milk | 0.0 | 0.0 | 0.0 | 0.0 | 1.5 |
| Sweet Aromatics | 1.5 | 1.0 | 1.0 | 1.8 | 1.5 |

TABLE 11A-continued

Aromatic flavor characteristics of chocolate with and without Chardonnay marc.

|  | CONTROL 1 | CONTROL 2 | CONTROL 3 | CONTROL 4 | PROTOTYPE Batch 1 |
|---|---|---|---|---|---|
| Vanilla Complex | 1.5 | 1.0 | 1.0 | 1.8 | 1.5 |
| Vanilla | 1.3 | 0.0 | 1.0 | 0.0 | 0.0 |
| Vanillin | 0.0 | 0.0 | 0.0 | 1.8 | 1.5 |
| Fruity Complex | 1.0 | 1.0 | 1.0 | 1.5 | 2.0 |
| Brown Fruit | 1.0 | 1.0 | 1.0 | 1.0 | 1.0 |
| Raisin | 0.0 | 0.0 | 0.0 | 0.0 | 1.0 |
| Red Fruit | 0.0 | 0.0 | 0.0 | 1.0 | 1.3 |
| Nutty | 0.0 | 0.0 | 0.0 | 0.8 | 1.0 |
| Winey | 0.5 | 1.3 | 1.0 | 0.0 | 0.0 |
| Woody | 1.0 | 1.5 | 1.3 | 0.0 | 1.0 |

Intensities in bold indicate where both Control 4 and the prototype are outside the control space of Controls 1-3.

TABLE 11B

Basic taste characteristics and chemical feeling factors of chocolate with and without Chardonnay marc.

|  | CONTROL 1 | CONTROL 2 | CONTROL 3 | CONTROL 4 | PROTOTYPE Batch 1 |
|---|---|---|---|---|---|
| BASICS | | | | | |
| Sweet | 7.8 | 6.0 | 6.0 | 9.8 | 8.3 |
| Sour | 2.5 | 2.8 | 2.5 | 2.3 | 4.0 |
| Salt | 2.3 | 2.0 | 2.3 | 2.3 | 3.0 |
| Bitter | 3.5 | 4.3 | 4.5 | 2.3 | 2.3 |
| CHEMICAL FEELING FACTORS | | | | | |
| Astringent | 2.0 | 3.0 | 3.3 | 2.0 | 3.0 |

Intensities in bold indicate where both Control 4 and the prototype are outside the control space of Controls 1-3.

TABLE 11C

Texture and residual mouthfeel characteristics of chocolate with and without Chardonnay marc.

|  | CONTROL 1 | CONTROL 2 | CONTROL 3 | CONTROL 4 | PROTOTYPE Batch 1 |
|---|---|---|---|---|---|
| TEXTURE | | | | | |
| First Chew | | | | | |
| Hardness with incisors | 11.5 | 11.0 | 11.3 | 9.5 | 9.0 |
| Snap | 13.5 | 13.0 | 14.0 | 10.0 | 10.0 |
| Fracturable | 7.0 | 7.0 | 7.5 | 6.0 | 6.0 |
| Chewdown | | | | | |
| Moistness of Mass* | 10.0 | 10.5 | 10.0 | 12.0 | 11.0 |
| Cohesiveness of Mass* | 9.5 | 10.3 | 9.5 | 10.0 | 9.5 |
| Adhesive to Palate* | 3.5 | 4.0 | 3.5 | 5.0 | 3.5 |
| Rough of Mass* | 5.5 | 6.0 | 6.0 | 5.5 | 5.0 |
| Lumpy | 4.5 | 5.0 | 5.0 | 5.5 | 5.0 |
| Coarse | 1.0 | 1.0 | 1.0 | 0.0 | 0.0 |
| Rate of Melt | 6.0 | 6.8 | 6.0 | 8.3 | 7.8 |
| RESIDUAL | | | | | |
| Toothpack/Toothstick | 3.5 | 3.5 | 3.5 | 3.3 | 3.5 |
| Oily/Greasy Mouthcoat | 4.0 | 3.0 | 2.0 | 3.0 | 2.0 |

TABLE 11C-continued

Texture and residual mouthfeel characteristics of chocolate with and without Chardonnay marc.

|  | CONTROL 1 | CONTROL 2 | CONTROL 3 | CONTROL 4 | PROTOTYPE Batch 1 |
|---|---|---|---|---|---|
| Sticky/tacky Mouthcoat | 0.5 | 0.0 | 0.0 | 1.0 | 0.0 |
| Chalky Mouthcoat | 1.3 | 2.5 | 2.3 | 1.0 | 3.5 |

*Evaluated after 3-4 chews. Intensities in bold indicate where both Control 4 and the prototype are outside the control space of Controls 1-3.

Batch 4 Prototype Chocolate Sensory Panel

Tables 12A-C show the results of the sensory panel evaluating the Batch 4 prototype produced in Example 3. Briefly, the prototype was noticeably different from the controls in some aromatic flavor attributes and residual mouthfeel attributes, while remaining in the control space for most aromatic and all basic taste and texture attributes. The Batch 4 exhibited a lower chocolate essence which resulted in lower overall chocolate impression than the control chocolates. Batch 4 also lacked a dark roast aromatic and had a slight nonfat dry milk aromatic that was not present in the controls. The vanilla complex of Batch 4 was distinct from the control, having a vanilla character with a slight vanilla presence, while the control chocolates had a stronger vanilla character and lacked vanillin. The fruit complex of Batch 4 was characterized as red fruity with supporting brown fruit, in contrast to controls 5 and 7, which were all brown fruit. The woody note in Batch 4 was further characterized as brown spice, in contrast to that of control 5, which was characterized as precious wood. The hardness with incisors, snap, and fracturable attributes of Batch 4 on first chew were well within the control space, as were the coarse and rate of melt chewdown attributes. A chalky residual mouthfeel was also perceived in Batch 4. Notably, the Batch 4 prototype was within the control space in terms of all basic tastes and astringency, and was the lowest-rated chocolate in terms of bitter taste (Table 12B). This is surprising, considering that Chardonnay marc is high in phenols that would be expected to add a bitter and/or astringent flavor. Further, the Batch 4 prototype was within the control space in terms of texture (Table 12C), despite the addition of Chardonnay marc which is high in fiber and would be expected to impact the texture of the chocolate.

TABLE 12A

Aromatic flavor characteristics of chocolate with and without Chardonnay marc.

|  | CONTROL 5 | CONTROL 6 | CONTROL 7 | PROTOTYPE Batch 4 |
|---|---|---|---|---|
| AROMATICS |  |  |  |  |
| Total Intensity | 8.5 | 8.0 | 7.8 | 7.5 |
| Overall Chocolate Impression | 3.8 | 4.5 | 4.0 | 2.5 |
| Chocolate Essence | 3.0 | 3.5 | 3.0 | 1.0 |
| Cocoa Complex | 1.0 | 1.0 | 1.0 | 1.5 |
| Woody/burlap | 1.0 | 0.5 | 0.0 | 1.0 |
| Red Fruity | 0.0 | 0.0 | 1.0 | 1.0 |
| Dark Roast | 2.0 | 1.0 | 1.0 | 0.0 |
| Dairy Complex | 0.0 | 0.0 | 1.0 | 1.5 |
| Cooked Milk | 0.0 | 0.0 | 1.0 | 0.0 |
| Nonfat Dry Milk | 0.0 | 0.0 | 0.0 | 1.5 |
| Butter Fat | 0.0 | 1.0 | 0.0 | 0.0 |
| Sweet Aromatics | 2.0 | 1.5 | 1.8 | 1.5 |
| Vanilla Complex | 1.5 | 1.5 | 1.8 | 1.5 |
| Vanilla | 1.5 | 1.5 | 1.8 | 0.5 |
| Vanillin | 0.0 | 0.0 | 0.0 | 1.0 |
| Caramelized | 0.8 | 0.0 | 0.0 | 0.0 |
| Fruity Complex | 2.5 | 1.5 | 1.5 | 2.5 |
| Brown Fruit | 2.5 | 0.0 | 1.5 | 0.8 |
| Raisin | 2.0 | 0.0 | 0.0 | 0.8 |
| Fig | 0.5 | 0.0 | 0.5 | 0.0 |
| Red Fruit (outside of cocoa) | 0.0 | 1.5 | 0.0 | 1.8 |
| Nutty | 0.0 | 0.0 | 0.5 | 0.0 |
| Winey | 0.0 | 1.0 | 0.0 | 0.0 |
| Woody (outside of cocoa) | 1.0 | 0.0 | 0.0 | 1.0 |

Intensities in bold indicate where both the prototype was outside the control space of Controls 5-7.

TABLE 12B

Basic taste characteristics and chemical feeling factors of chocolate with and without Chardonnay marc.

|  | CONTROL 5 | CONTROL 6 | CONTROL 7 | PROTOTYPE Batch 4 |
|---|---|---|---|---|
| BASICS |  |  |  |  |
| Sweet | 7.5 | 8.0 | 8.3 | 8.0 |
| Sour | 2.5 | 2.3 | 2.5 | 3.0 |
| Salt | 4.0 | 2.5 | 2.8 | 2.8 |

TABLE 12B-continued

Basic taste characteristics and chemical feeling factors of chocolate with and without Chardonnay marc.

|  | CONTROL 5 | CONTROL 6 | CONTROL 7 | PROTOTYPE Batch 4 |
|---|---|---|---|---|
| Bitter | 3.5 | 2.8 | 2.3 | 2.0 |
| CHEMICAL FEELING FACTORS |  |  |  |  |
| Astringent | 3.8 | 3.5 | 3.3 | 4.5 |

The prototype was within the control space of Controls 5-7 in basic taste and chemical feeling factors.

TABLE 12C

Texture and residual mouthfeel characteristics of chocolate with and without Chardonnay marc.

|  | CONTROL 5 | CONTROL 6 | CONTROL 7 | PROTOTYPE Batch 4 |
|---|---|---|---|---|
| TEXTURE |  |  |  |  |
| First Chew |  |  |  |  |
| Hardness with incisors | 12.8 | 11.0 | 8.5 | 10.3 |
| Snap | 12.0 | 10.0 | 9.0 | 10.3 |
| Fracturable | 7.8 | 6.0 | 5.8 | 6.0 |
| Chewdown |  |  |  |  |
| Moistness of Mass* | 13.0 | 12.0 | 12.3 | 12.0 |
| Cohesiveness of Mass* | 9.0 | 10.0 | 10.0 | 10.0 |
| Grit between teeth* | 0.0 | 0.0 | 0.0 | 0.0 |
| Adhesive to Palate* | 3.0 | 3.0 | 3.5 | 3.3 |
| Rough of Mass* | 5.5 | 5.5 | 5.0 | 5.5 |
| Grainy | 1.0 | 0.0 | 0.0 | 0.0 |
| Gritty | 0.0 | 0.0 | 0.0 | 0.0 |
| Lumpy | 3.5 | 5.0 | 5.0 | 4.5 |
| Coarse | 1.0 | 0.5 | 0.0 | 1.0 |
| Rate of Melt | 6.5 | 8.0 | 8.5 | 7.8 |
| RESIDUAL |  |  |  |  |
| Toothpack/Toothstick | 2.8 | 3.5 | 3.3 | 3.3 |
| Oily/Greasy Mouthcoat | 1.3 | 2.0 | 2.3 | 1.3 |
| Sticky/tacky Mouthcoat | 0.0 | 0.0 | 0.0 | 0.0 |
| Chalky Mouthcoat | 2.8 | 1.0 | 1.0 | 4.0 |

*Evaluated after 3-4 chews. Intensities in bold indicate where the prototype was outside the control space of Controls 5-7.

Example 5: Flavonoid Content of Chardonnay Marc and Chocolates Comprising Chardonnay Marc Flavonoid Analysis of Chardonnay Marc The Chardonnay marc prepared in Example 1 was analyzed for the presence and quantity of flavonoid compounds.

Methodology

To extract the phenolic compounds, Chardonnay marc was sonicated in 50% methanol:water in a 1:50 ratio by weight for 1 h at room temperature in a Lyman Turbo Sonic 6000 at 35 kHz. The supernatant was filtered through a 0.45 µm Fisher Brand Nylon membrane prior to the ultra-performance liquid chromatography (UPLC) injection (5 µL). The phenolic compound separation and quantification was conducted on an Agilent Zorbax Eclipse Plus C18 Rapid Resolution HD (3×100 mm, 1.8 µm) installed on an Agilent 1290 UPLC coupled with a diode array detector (DAD). This method was modified from Ji, Li, and Li (2015. "Rapid separation and identification of phenolics in crude red grape skin extracts by high performance liquid chromatography coupled to diode array detection and tandem mass spectrometry." *Journal of Chromatography A,* 1414, 138-146.). The mobile phase consisted of solvent A (0.2% formic acid in nanopure water) and solvent B (50% ACN:MeOH), with the gradient 95% to 65% A at 0-30 min; 65% to 60% A at 30-40 min; and 60% to 95% at A 40-42 min and flow rate was set to 0.5 mL/min. Each individual phenolic concentration was determined by peak area at 280 nm and individual calibration curves.

Results

Tables 13A-13C show the concentrations select flavonoid and phenolic compounds detected in the Chardonnay marc. A large body of scientific literature documents physiological effects and associated health benefits in humans and animals regarding dietary consumption of foods, beverages, and dietary supplements containing these compounds. It is also known that these compounds are generally bitter and astringent, thus presenting challenges for their incorporation into products with favorable sensory performance. Thus, Chardonnay marc represents a unique opportunity to deliver these compounds to food products via a material that contributes to highly desirable sensory performance and consumer compliance, rather than detracting from the sensory performance of the food product (see Examples 4, 7, and 8).

TABLE 13A

Chardonnay marc flavan-3-ol concentrations.

| Flavan-3-ol | Concentration (mg/kg dry weight ± SD) |
|---|---|
| (−)-Gallocatechin | 1490.53 ± 39.28 |
| (−)-Epigallocatechin | 249.73 ± 4.18 |
| (+)-Catechin | 671.16 ± 11.57 |
| (−)-Epigallocatechin gallate | 24.24 ± 0.21 |

TABLE 13A-continued

Chardonnay marc flavan-3-ol concentrations.

| Flavan-3-ol | Concentration (mg/kg dry weight ± SD) |
|---|---|
| (−)-Epicatechin | 887.79 ± 28.74 |
| (−)-Gallocatechin gallate | 0.00 ± 0.00 |
| (−)-Epicatechin gallate | 27.65 ± 1.21 |
| (−)-catechin gallate | 0.00 ± 0.00 |

TABLE 13B

Chardonnay marc phenolic acid concentrations.

| Phenolic Acid | Concentration (mg/kg dry weight ± SD) |
|---|---|
| Gallic acid | 115.98 ± 1.79 |
| Vanillic acid | 15.36 ± 1.68 |

TABLE 13C

Chardonnay marc stilbene concentrations.

| Stilbene | Concentration (mg/kg dry weight ± SD) |
|---|---|
| Trans-polydatin | 0.00 ± 0.00 |
| Trans-resveratrol | 26.33 ± 0.54 |

Flavonoid Analysis of Chocolate Comprising 15% Chardonnay Marc

The chocolate Batch 4 prepared in Example 3 was analyzed for the presence and quantity of flavonoid compounds.

Methodology

1. Fat removal. To remove excessive fat in the chocolate sample, 5 g of ground chocolate was weighed and dissolved in 45 mL hexane. The combined mixture was vortexed for 1 min, sonicated at 50° C. for 5 min, and centrifuged at 1700 rcf. The supernatant was decanted and the fat removal process was repeated two more times for a total of three hexane extractions. The solid chocolate portion was air-dried in a fumehood overnight to evaporate residual hexane.

2. Catechin and Epicatechin Enantiomers 2.1 Sample Extraction. Catechin and epicatechin enantiomers were characterized according to the AOAC Official Method 2013.04 (Machonis et al. 2014. "Method for the determination of catechin and epicatechin enantiomers in cocoa-based ingredients and products by high-performance liquid chromatography: first action 2013.04." *Journal of AOAC International*, 97(2), 506-509). Briefly, 50 mg of defatted chocolate was weighed and dissolved in 5 mL methanol:water:acetic acid (MWAA, 700:295:5, by vol.). The mixture was vortexed for 1 min and sonicated at 50° C. for 5 min for extraction. After centrifugation at 1700 rcf for 5 min, the supernatant was filtered through a 0.45 μm PTFE filter into a 2 mL amber vial for LC-FLD injection.

2.2 HPLC-FLD Determination. An Astec Cyclobond 1-2000 RSP chiral column (250×4.6 mm×5 μm) was used for separation. The isocratic mobile phase was 20 mM ammonium acetate buffer (pH 4.0): methanol (7:3, by vol.) with a flow rate of 1 min/mL. The sample injection volume was 10 μL. The column temperature was set at 35° C. The FLD was set with an excitation wavelength of 276 nm and an emission wavelength of 316 nm. The quantification was performed against calibration curves of (+)-catechin, (−)-catechin, (+)-epicatechin (not detected) and (−)-epicatechin, respectively. Analysis was conducted in duplicate.

3. Flavanols and Procyanidins DP1-7

3.1 Sample Extraction. Flavanols and procyanidins DP1-7 were characterized following the newly published AOAC Official Method[SM] 2020.05 (Bussy et al. 2020. "Single-Laboratory Validation for the Determination of Cocoa Flavanols and Procyanidins (by Degree of Polymerization DP1-7) in Cocoa-Based Products by Hydrophilic Interaction Chromatography Coupled with Fluorescence Detection: First Action 2020.05." *Journal of AOAC International*). Briefly, 200 mg of defatted chocolate sample was weighed and dissolved in 5 mL acetone:water:acetic acid (AWAA, 70:30:1, by vol.). The mixture was vortexed for 1 min and sonicated at 50° C. for 5 min. After centrifugation at 1700 rcf for 5 min, the supernatant was further cleaned up on a SPE MCX PRIME cartridge to eliminate the accumulation of matrix components on column which might lead to poor analytical performance. The SPE cartridge was conditioned using 2 mL AWAA and followed by 2.5 mL of extract. A total of 12 mL AWAA was then added to elute the extract into a 15 mL Falcon tube. Eventually, the AWAA-extract mixture was transferred into a 25 mL volumetric flask and further diluted with AWAA to a total of 25 mL solution. An aliquot was transferred to a 2 mL amber vial for LC-FLD injection.

3.2 HPLC-FLD Determination. A Waters Torus diol column (100×3.0 mm×1.7 μm, 130A° particle size) was used for separation. The mobile phase is a binary gradient consisting of (A) acetonitrile:acetic acid (98:2, by vol.) and (B) methanol:water:acetic acid (95:3:2, by vol.) with a flow rate of 1 min/mL. The sample injection volume was 2 μL. The column temperature was held at 50° C. The mobile phase gradient followed 0% B for 0.37 min and ramped to 45% B at 10.4 min and to 95% B at 10.65 min. Then 95% B was held for 2.35 min prior to returning to starting conditions (0% B) in 0.1 min. The total run time was 13.1 min. The FLD was set with an excitation wavelength of 230 nm and an emission wavelength of 321 nm. The quantification was performed against calibration curves of a cocoa extract reference material (NIST RM #8403) at each DP concentration. Analysis was conducted in duplicate.

Results

Tables 14A-14B show the concentrations of flavonoids detected in the chocolate comprising 15% Chardonnay marc. The total concentration of flavanols and procyanidins (DP1-7) per serving was found to be 262.59±3.72 mg/30 g serving with fat (fat content of 42%). As discussed above, a large body of scientific literature documents physiological effects and associated health benefits in humans and animals regarding dietary consumption of foods, beverages, and dietary supplements containing these compounds. It is also known that these compounds are generally bitter and astringent, thus presenting challenges for their incorporation into products with favorable sensory performance. Thus, the chocolate comprising 15% Chardonnay marc represents a unique opportunity to deliver these compounds via food products having highly desirable sensory performance and consumer compliance attributes, as evidenced by the Batch 4 sensory attributes described in Example 4.

TABLE 14A

Flavan-3-ol concentrations in chocolate comprising 15% Chardonnay marc.

| Flavan-3-ol enantiomer | Concentration (mg/g ± SD defatted sample) | Enantiomer per serving (mg/30 g ± SD with fat*) |
|---|---|---|
| (−)-epicatechin | 2.30 ± 0.05 | 40.06 ± 0.95 |
| (+)-catechin | 0.76 ± 0.00 | 13.29 ± 0.05 |
| (−)-catechin | 0.21 ± 0.00 | 3.57 ± 0.08 |

*fat content of 42%

TABLE 14B

Flavanols and procyanidin (DP1-7) concentrations in chocolate comprising 15% Chardonnay marc.

| Degree of Polymerization (DP) | Concentration (mg/g ± SD defatted sample) |
|---|---|
| DP1 | 3.63 ± 0.02 |
| DP2 | 2.21 ± 0.01 |
| DP3 | 2.38 ± 0.02 |
| DP4 | 2.31 ± 0.01 |
| DP5 | 1.92 ± 0.02 |
| DP6 | 1.5 ± 0.02 |
| DP7 | 1.13 ± 0.02 |
| Total (DP1-7) | 15.09 ± 0.11 |

Figure 2A:
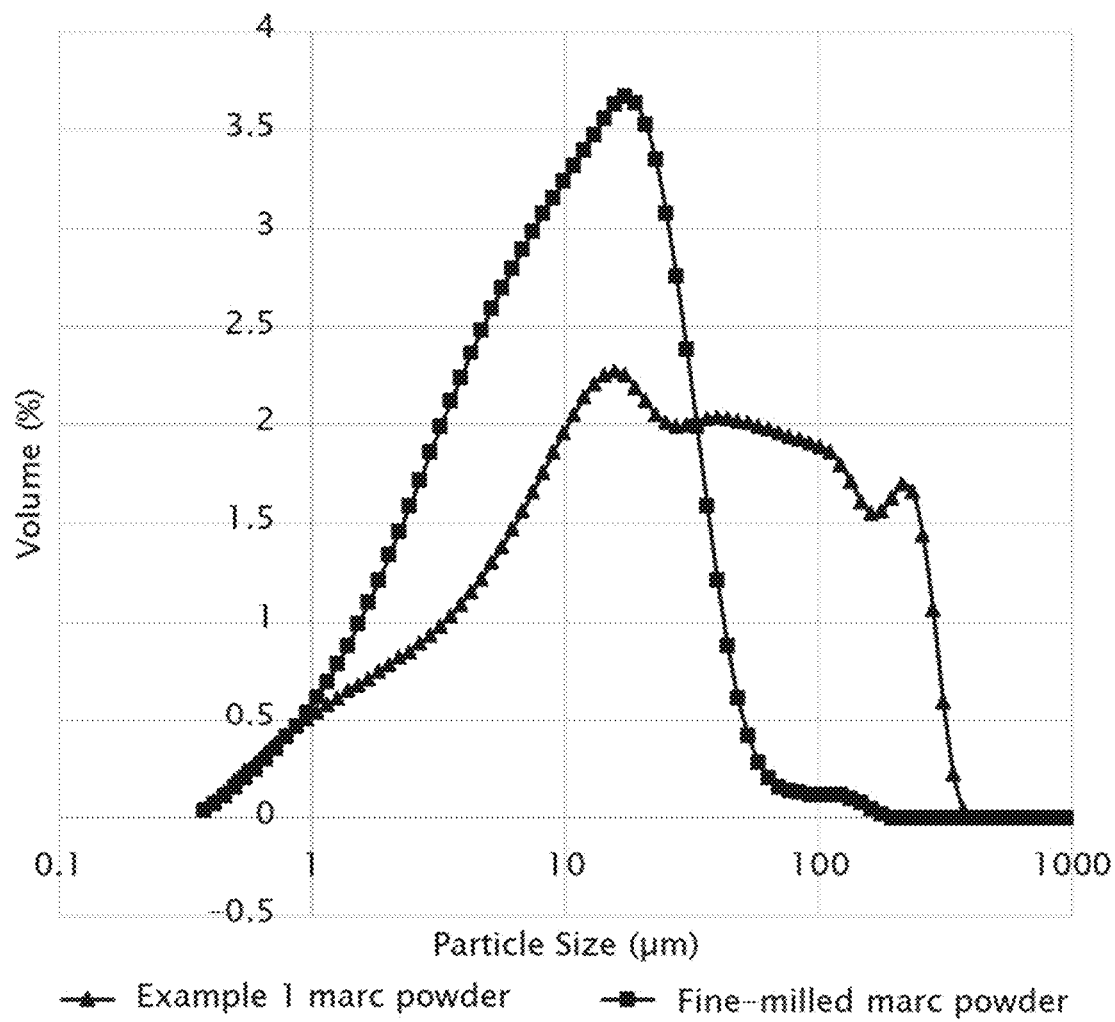
FIG. 2A depicts the particle size distribution of agricultural marc samples. The x-axis shows the particle size in logarithmic scale, and the y-axis shows the volume percentage of particles at each particle size.

Example 6: Particle Size Distribution of Chardonnay Marc and Chocolates Comprising Chardonnay Marc A fine-milled marc powder was produced by dry-milling Chardonnay marc. Samples of the fine-milled marc and the Chardonnay marc described in Example 1 (before milling) were analyzed via laser light diffraction using a Beckman-Coulter LS 13 320 to determine their particle size distribution. The particle size distributions of the marc samples are shown in FIG. 2A.

Figure 2B:
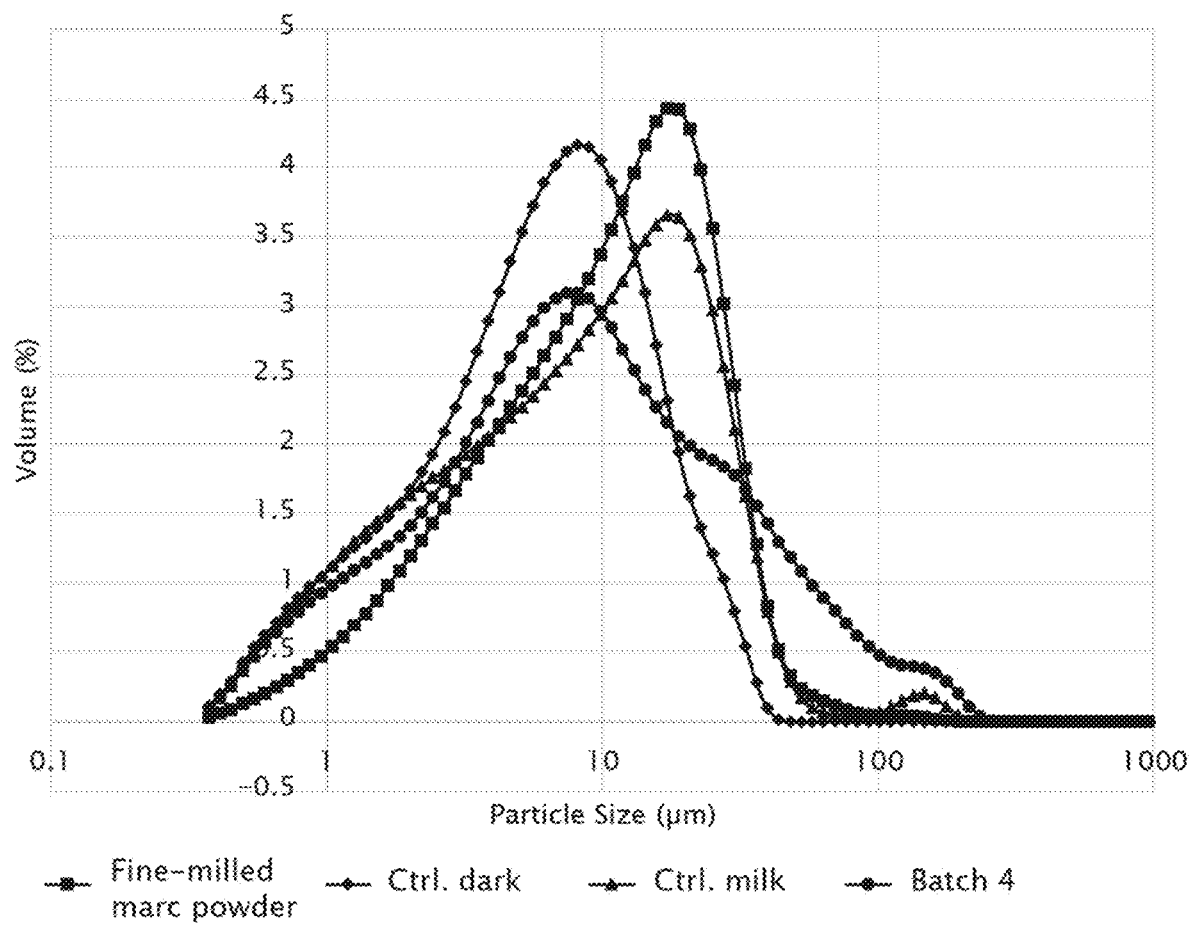
FIG. 2B depicts the particle size distribution of chocolates with and without agricultural marc. The x-axis shows the particle size in logarithmic scale, and the y-axis shows the volume percentage of particles at each particle size.

Next, the particle size distribution of the Batch 4 chocolate produced in Example 3, as well as a control dark chocolate and a control milk chocolate, were analyzed via laser light diffraction using a Beckman-Coulter LS 13 320. FIG. 2B depicts the particle size distribution of the chocolates, as well as the fine-milled marc sample for reference. The particle size of each chocolate was also measured by mixing a sample with soybean oil and measuring via micrometer. Table 15 shows the average particle size of the chocolates as measured by micrometer.

TABLE 15

Average particle size of chocolates with and without Chardonnay marc as measured by micrometer.

| Sample | Average (micron) |
|---|---|
| Control Dark | ~15-20 |
| Control Milk | ~20-25 |
| Batch 4 | 35 |

Figure 3A:
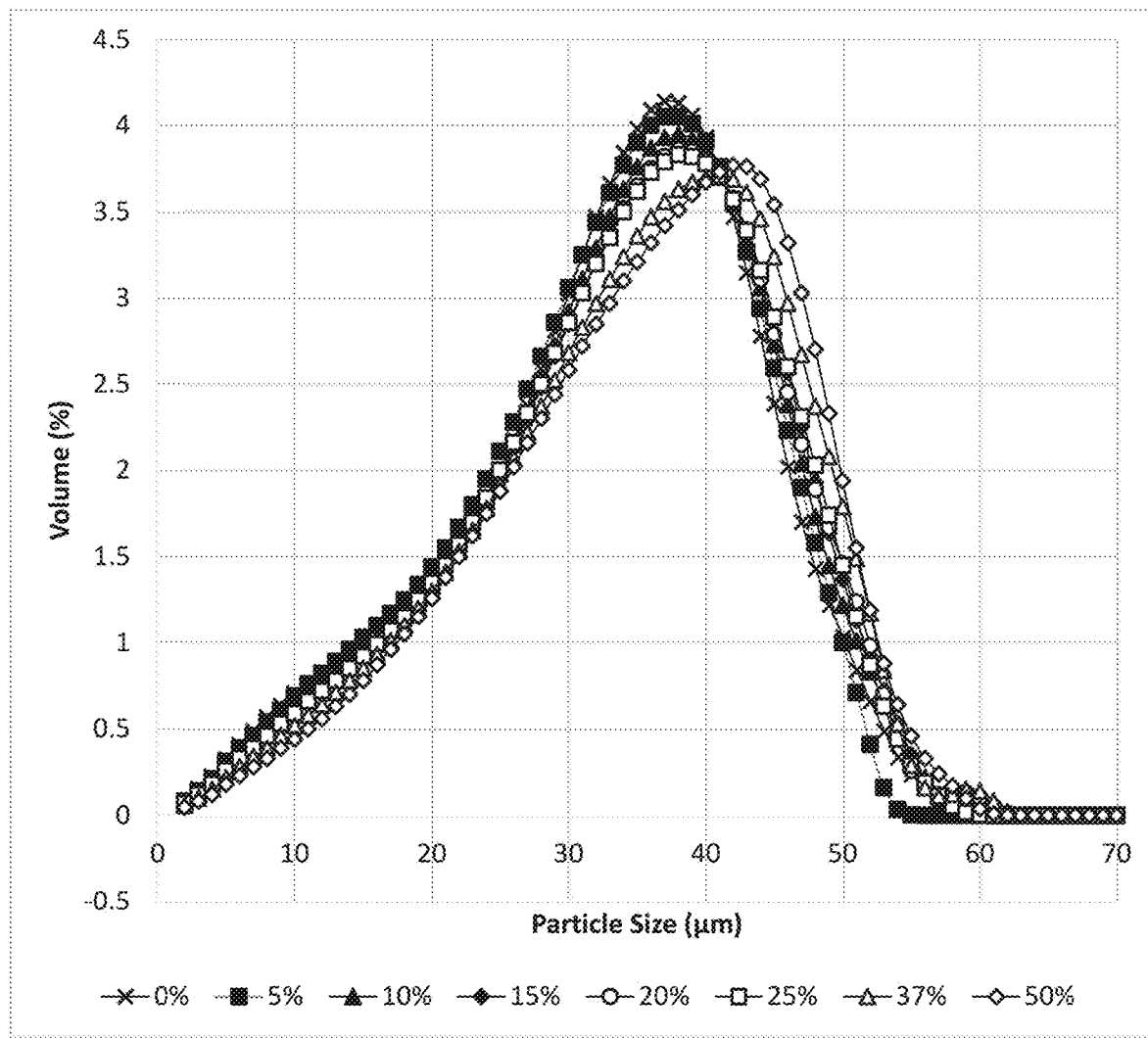
FIG. 3A depicts the particle size distributions of chocolates made with various concentrations of Chardonnay marc. The x-axis shows the particle size and the y-axis shows the volume percentage of particles at each particle size.
Figure 3B:
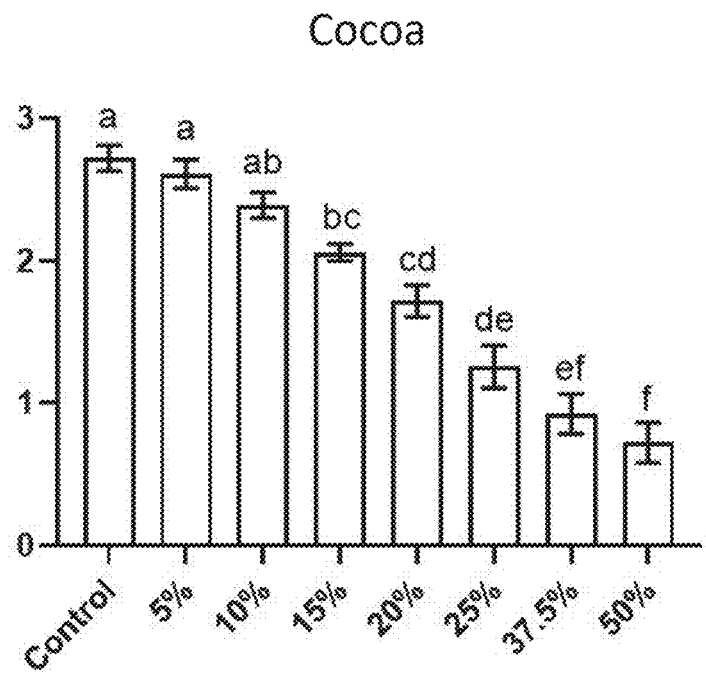
FIGS. 3B-3I depict the sensory attributes of chocolates produced with Chardonnay marc concentrations ranging from 5% to 50% by weight, as compared to a control chocolate having the same base composition but lacking Chardonnay marc.

Example 7: Sensory Characterization of Increasing Levels of Chardonnay Marc in Dark Chocolate High in Cocoa Flavanols Preparation of Chocolates with Various Concentrations of Chardonnay Marc Eight batches of chocolate containing a range of Chardonnay marc concentrations were produced. High-cocoa flavanol (high-CF) base chocolates were batched in a temperature controlled bowl held at 60° C. The ingredients were melted in a 55° C. convection oven and analyzed by micrometer for particle size. Table 16A shows the percentage and particle size of the ingredients used in the base chocolate. Cocoa butter was added visually to achieve a fluid paste. The batches were refined twice on a Lehmann 3 roll refiner to achieve target sizes of nominally 30-35 μm by micrometer. Refiner flake was placed into 55° C. convection oven until re-melted. The entire batch of samples were remixed by spatula and sampled for micrometer particle size. Prior to the addition of Chardonnay marc, the high-CF base chocolate contained 301 mg cocoa flavanols per 30 g serving (with fat). The fine-milled 2 Chardonnay marc powder produced in Example 6 was weighed according to the recipes in Table 16B. The weighed marc powder was added and the samples were conched for one hour at 55° C. in a 1 kg sigma blade jacketed mixer. High levels of marc powder required additional cocoa butter to achieve a dry conche consistency. The remaining cocoa butter was added and mixed for 30 minutes to liquefy. Samples were withdrawn for rheology measurement following the standard National Confectioners Association and Chocolate Manufacturers Association (NCA/CMA) method for fluid chocolate (spindle 27, 40° C., confidence of fit >98% for all measurements). Table 16B shows the ingredient makeup and Casson viscosity and yield values of each chocolate. The particle size distribution of each chocolate as measured by laser diffraction is shown in FIG. 3A. The chocolates were then molded into bars and evaluated for sensory attributes.

TABLE 16A

Percentage and particle size of ingredients used in the high-CF base chocolate.

| | High-CF Unsweetened Chocolate (%) | Deodorized Cocoa Butter (%) | Sucrose (%) | Lecithin (%) | Total Fat (%) |
|---|---|---|---|---|---|
| Base chocolate | 40.9 | 19 | 40 | 0.5 | 35.2 |

TABLE 16B

Ingredient formulas for chocolates containing various concentrations of Chardonnay marc.

| | Marc Addition (% by weight) | | | | | | | |
|---|---|---|---|---|---|---|---|---|
| | 0 | 5 | 10 | 15 | 20 | 25 | 37.5 | 50 |
| Ingredients (% by weight) | | | | | | | | |
| High-CF Unsweetened Chocolate | 37 | 34.2 | 31.3 | 28.4 | 25.6 | 22.6 | 15.6 | 8.5 |
| Cocoa butter | 26.6 | 27.3 | 28.0 | 28.7 | 29.4 | 30.0 | 31.6 | 33.2 |
| Sucrose | 36.2 | 33.4 | 30.6 | 27.8 | 25.0 | 22.2 | 15.2 | 8.3 |
| Chardonnay Marc | 0.0 | 5.0 | 10.0 | 15.0 | 20.0 | 25.0 | 37.5 | 50.0 |
| Lecithin | 0.5 | 0.5 | 0.5 | 0.5 | 0.5 | 0.5 | 0.5 | 0.5 |
| Total | 100.4 | 100.4 | 100.4 | 100.4 | 100.4 | 100.3 | 100.4 | 100.5 |
| Rheology Measurements | | | | | | | | |
| Casson Viscosity[1] (Poise) | 16.5, 16.0 | 15.1, 14.8 | 15.8, 15.2 | 16.8, 15.9 | 17.3, 16.7 | 15.4, 15.1 | — | — |
| Casson Yield Value[1] (dyne/cm$^2$) | 51, 42.6 | 45.5, 44.6 | 45.9, 44.7 | 46.1, 45.1 | 41.7, 39.5 | 41.8, 40.0 | — | — |
| Cocoa Flavanol Content (calculated)[2] | | | | | | | | |
| mg cocoa flavanols per 30 g serving | 273 | 252 | 230 | 210 | 188 | 167 | 115 | 62 |

[1]Comma-separated values represent independent replicate measurements.
[2]Values represent calculated amounts of cocoa flavanols from the base chocolate, and do not include flavanols from the added marc.

Sensory Method

A group of six panelists (5 males; 1 female; ages 32-60+) with 10-20+ years' professional experience in the food or dietary supplement industry was used to determine the sensory attributes of the chocolates employing a modified quantitative descriptive analysis. Ten flavor attributes from three flavor categories were evaluated including: 1) retro-nasal aroma (five attributes; in-mouth); 2) basic taste (four tastes; bitter, sweet, salty, sour); 3) mouthfeel—astringency (pleasant mouthfeel). The flavor attributes evaluated in this study are shown in Tables 17A-C.

TABLE 17A

Five aroma attributes (Retronasal-in-mouth).

| Retronasal Aroma | References | Definitions |
|---|---|---|
| Cocoa | Roasted cacao nibs | Aroma associated with roasted cacao nibs |
| Fruity | Canned mixed fruit (Dole) | Aroma associated with fruity characteristics |
| Roasty | Roasted coffee beans | Aroma associated with roasted foods |
| Nutty | Almonds | Aroma associated with nuts |
| Caramelized | Brown sugar | Aroma associated with brown sugar |

TABLE 17B

Four basic tastes.

| Taste | References | Definitions |
|---|---|---|
| Sour | 0.4% citric acid solution | Taste associated with citric acid solution |
| Bitter | 0.02% caffeine solution | Taste associated with caffeine solution |

TABLE 17B-continued

Four basic tastes.

| Taste | References | Definitions |
|---|---|---|
| Sweet | 6% sucrose solution | Taste associated with sucrose solution |
| Salty | 0.5% NaCl solution | Taste associated with salt solution |

TABLE 17C

Mouthfeel.

| Mouthfeel | References | Definitions |
|---|---|---|
| Astringency | 0.4% Alum solution | Puckering/drying mouthfeel |

For the sensory evaluation, the panelists were asked to taste each chocolate and asked to score each flavor attribute on a nine-point scale from 0 to 4, in which 0=not observable, 1=weak intensity, 2=moderate intensity, 3=strong intensity, and 4=extreme intensity (in 0.5 increments). First, the control chocolate was evaluated and scored for all ten flavor attributes. Then, each test chocolate was evaluated, and the panelists were asked to score the test chocolate's flavor attributes in relation to the intensity of the same flavor attribute in the control chocolate. For palate cleansing, breaks were taken in between each flavor evaluation. The sensory experiment was conducted in triplicate. The scores for each attribute (8 samples; 10 attributes; 6 panelists in triplicate (18 observations per attribute); 1440 total observations) were compiled. The mean (M) and the standard error of the mean (SEM) were calculated using Microsoft® Excel Version 16.21 for Office 360 (Microsoft Corporation, Redman, Wash.). To compare the intensity of each chocolate flavor attribute, the mean rating of each attribute was evaluated using a one-way analysis of variance (ANOVA). If ANOVA proved to be significant, means were separated with Tukey-Kramer HSD test. All statistical analyses were was performed using JMP Pro 14.0.0 software (SAS Institute, Cary, N.C.) with a significance level of α=0.05. Graphs were prepared using GraphPad Prism version 9.0.0 for Windows (GraphPad Software, San Diego, Calif.).

Results

Chocolates with up to 25% Chardonnay marc exhibited Casson viscosity and yield values similar to the control, demonstrating no negative impacts on flow with the addition of Chardonnay marc (Table 16B).

Figure 3C:
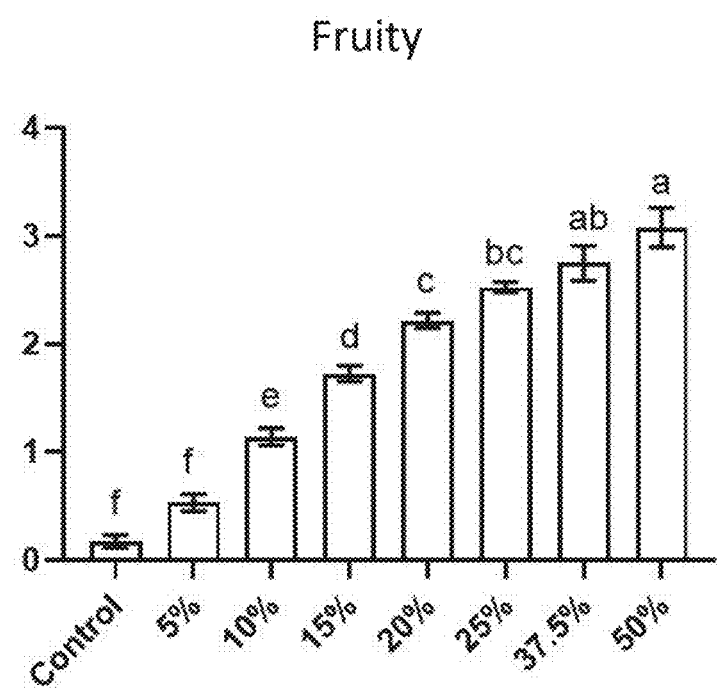
Figure 3D:
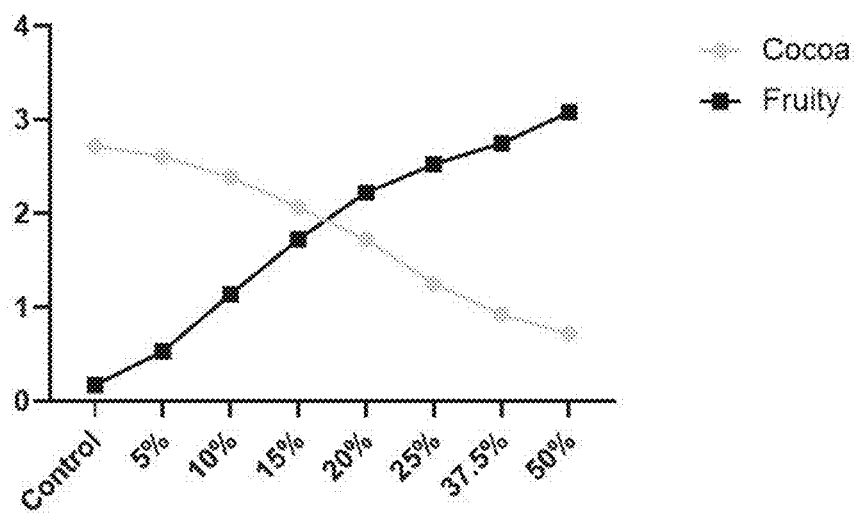
Figure 3E:
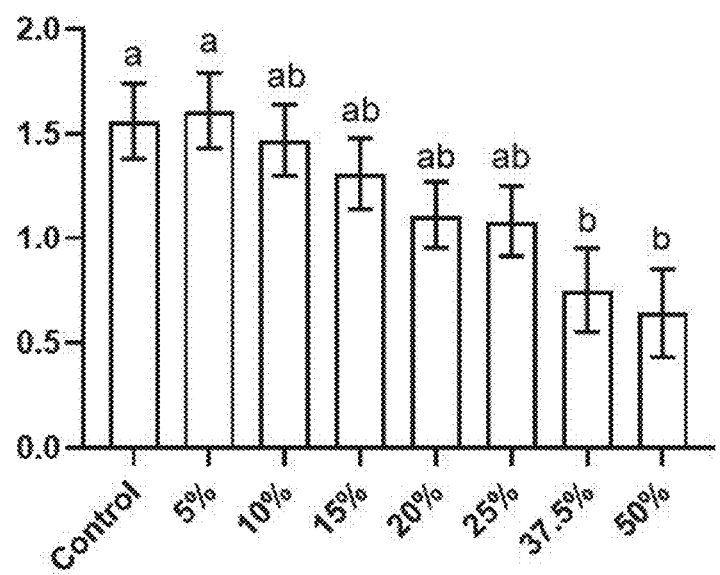
Figure 3F:
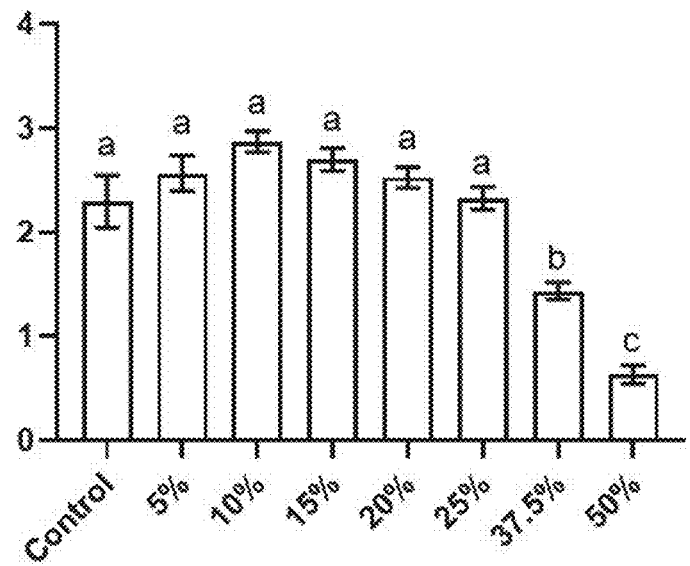
Figure 3G:
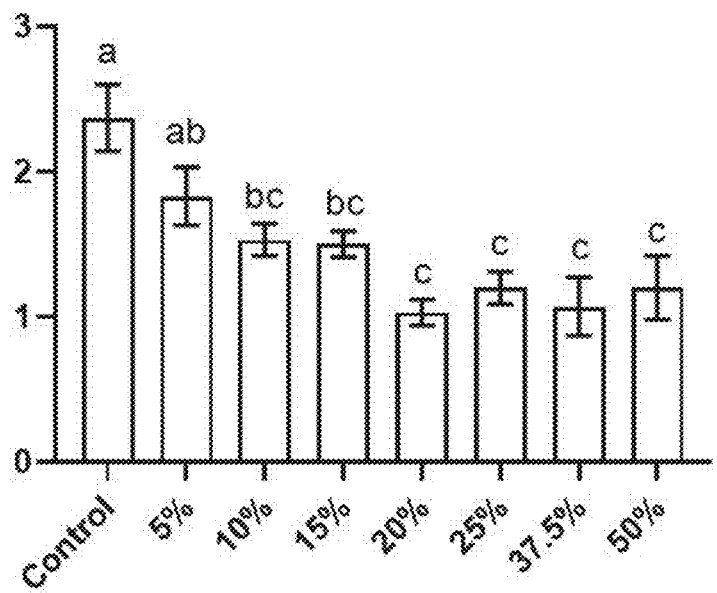
Figure 3H:
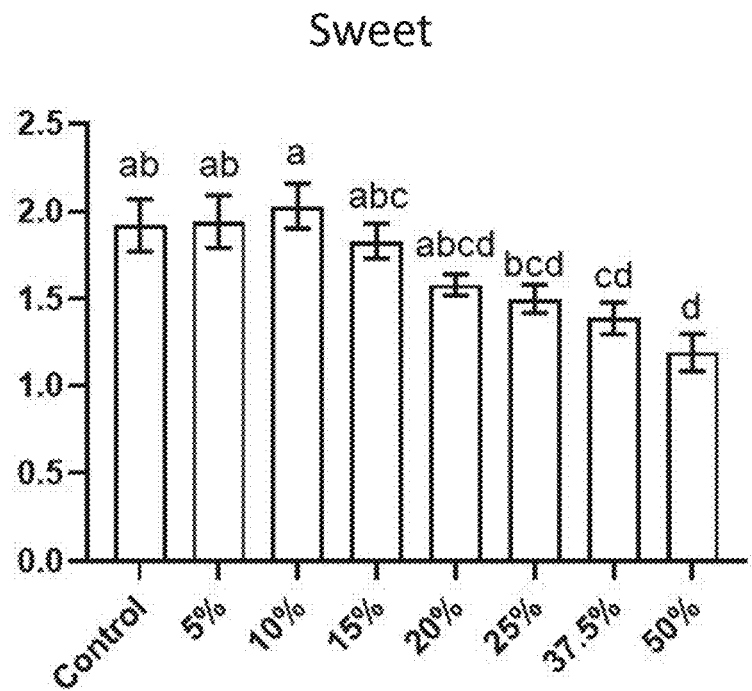
Figure 3I:
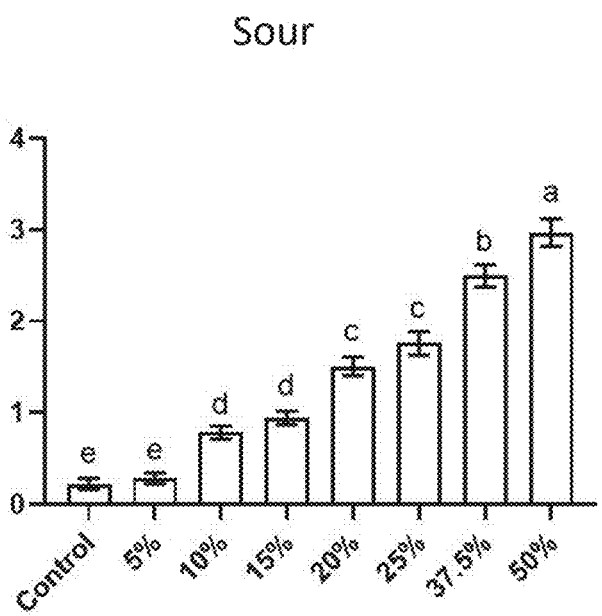

The flavor and aroma attributes that were significantly different between the different chocolates are shown in FIGS. 3B-3I. Cocoa aroma attribute levels decreased at 15% by weight or greater Chardonnay marc (FIG. 3B), while fruity aroma attributes increased 10% by weight or greater Chardonnay marc (FIG. 3C). The inverse relationship between cocoa and fruity aroma attributes with Chardonnay marc addition is shown in FIG. 3D. The roasty aroma attribute was only significantly decreased compared to the control at 37.5% and 50% by weight Chardonnay marc (FIG. 3E). Chardonnay marc led to a significant increase in sour taste attributes (FIG. 3I) at concentrations of 10% by weight and higher. Interestingly, sweet taste attributes were maintained at acceptable levels at all concentrations of Chardonnay marc, and only significantly decreased compared to the control at 37.5% and 50% by weight Chardonnay marc (FIG. 3H). This is surprising, considering that the addition of marc to the base chocolate reduces the overall sugar content of the final chocolate. For example, the 25% Chardonnay marc chocolate showed no significant decrease in sweetness despite a ~40% sugar reduction as compared to the control chocolate (Table 16B). No statistically significant differences were observed in the nutty, caramelized, and salty attributes of the chocolates.

Foods that are high in phenols (e.g., flavanols), such as chocolate, often have an unpleasant, astringent mouthfeel and/or bitterness that needs to be balanced with other ingredients in order to achieve desirable sensory attributes. Additionally, food additives and ingredients that are high in phenols would be expected to increase the astringent mouthfeel and bitterness of foods that are already high in phenols. Surprisingly, despite the addition of Chardonnay marc high in flavanols to a chocolate already high in flavanols, pleasant mouthfeel attributes were maintained with no significant difference from the control at up to 25% by weight Chardonnay marc, and was maintained at acceptable levels up to at least 37.5% Chardonnay marc (FIG. 3F). Additionally, bitterness was significantly decreased with the addition of 10% or more Chardonnay marc, even up to 50% Chardonnay marc (FIG. 3G). These unexpected results demonstrate the value of Chardonnay marc as a food ingredient to increase the concentration of desired dietary flavanol antioxidants to chocolate while reducing bitterness and maintaining sweetness and a pleasant mouthfeel of the chocolate.

Figure 4A:
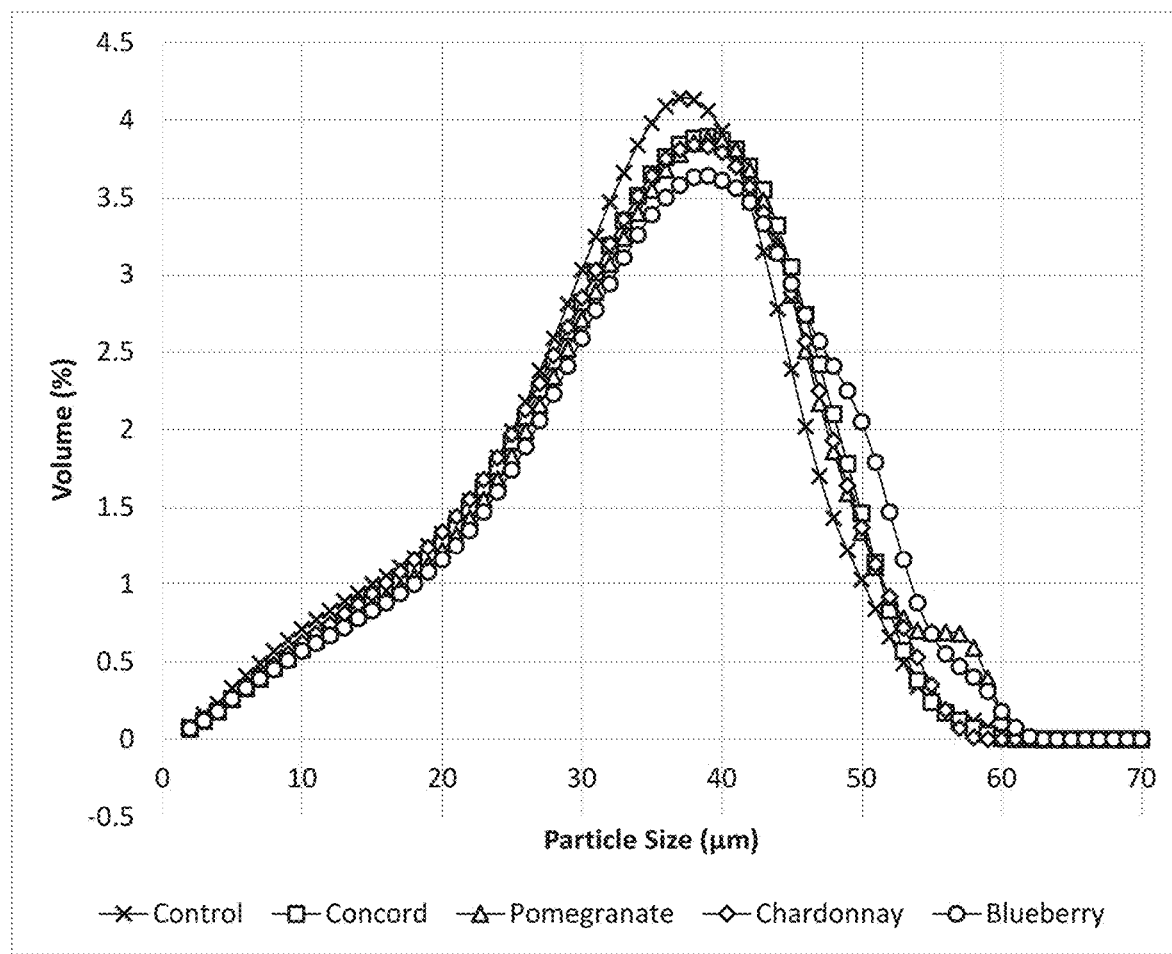
FIG. 4A depicts the particle size distributions of chocolates made with various fruit marcs at a concentration of 15% by weight. The x-axis shows the particle size and the y-axis shows the volume percentage of particles at each particle size.
Figure 4B:
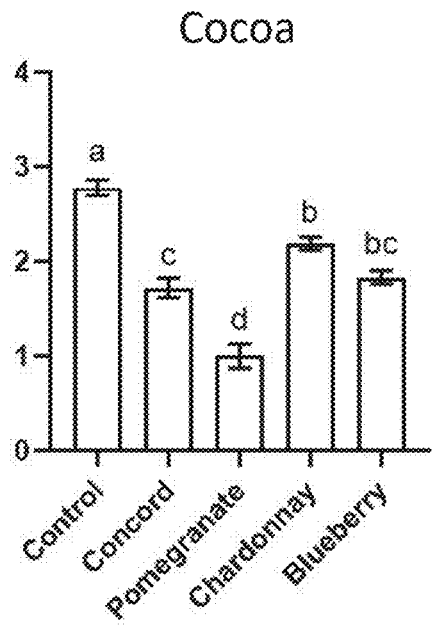
FIGS. 4B-4J depict sensory attributes of chocolates produced with Concord grape, pomegranate, Chardonnay, and blueberry marcs at a concentration of 15% by weight, as compared to a control chocolate having the same base composition but lacking marc.

Example 8: Sensory Characterization of 15% Addition of Four Different Fruit Marcs (Concord Grape, Pomegranate, Chardonnay, and Blueberry) in Dark Chocolate High in Cocoa Flavanols Preparation of Chocolates with Different Fruit Marcs Batches of chocolate containing Chardonnay, Concord grape, pomegranate, and blueberry marc at a concentration of 15% by weight were produced. Concord grape, pomegranate, and blueberry marcs were obtained and milled to powder. Milling conditions were varied to achieve nominal particle size of 30 microns. The particle size of the marcs before and after milling are shown in Table 18A. The fine-milled 2 Chardonnay marc produced in Example 6 was used to produce the 15% by weight Chardonnay marc chocolate. Chocolates were prepared with each marc using the method described in Example 7 and the high-CF base chocolate described in Table 16A. Table 18B shows the ingredient makeup of the chocolates. The only difference between the base chocolate and the final chocolate with 0% marc was the addition of 9.4% cocoa butter during conching. The particle size distribution of each of the final chocolates is shown in FIG. 4A.

TABLE 18A

Particle size of Concord grape, blueberry, and pomeagranate marcs before and after milling.

| Sample | Particle size (μm)[1] | |
|---|---|---|
| | Before milling | After milling |
| Concord grape marc | >200 | 20, 21, 25 |
| Blueberry marc | 118, 156, 130 | 30, 35, 37 |
| Pomegranate marc | 112, 179, 187 | 29, 32, 31 |

[1]Comma-separated values represent independent replicate measurements.

TABLE 18B

Ingredient formulas for chocolates containing various fruit marcs at a concentration of 15% by weight.

| | Marc Addition (% by weight) | |
|---|---|---|
| | 0 | 15 |
| Ingredient (% by weight) | | |
| High-CF unsweetened chocolate | 37 | 28.4 |
| Cocoa butter | 26.6 | 28.7 |
| Sucrose | 36.2 | 27.8 |
| Fruit Marc[1] | 0.0 | 15.0 |
| Lecithin | 0.5 | 0.5 |
| Total | 100.4 | 100.4 |
| Ingredient (% by weight) | | |
| High-CF unsweetened chocolate | 37 | 28.4 |
| Cocoa Flavanol Content (calculated)[2] | | |
| mg cocoa flavanols per 30 g serving | 273 | 210 |

[1]Concord grape, pomegranate, Chardonnay, or blueberry marc.
[2]Values represent calculated amounts of cocoa flavanols from the base chocolate, and do not include flavanols from the added marc.

Sensory Method

A group of six panelists (5 males; 1 female; ages 32-60+) with 10-20+ years' professional experience in the food or dietary supplement industry was used to determine the sensory attributes of the chocolates employing a modified quantitative descriptive analysis. Twelve flavor attributes from three flavor categories were evaluated including: 1) retronasal aroma (seven attributes; in-mouth), 2) basic taste (four tastes; bitter, sweet, salty, sour); 3) mouthfeel—astringency (pleasant mouthfeel). The flavor attributes evaluated in this study are shown in Tables 19A-C.

TABLE 19A

Seven aroma attributes (Retronasal-in-mouth).

| Retronasal Aroma | References | Definitions |
|---|---|---|
| Cocoa | Roasted cacao nibs | Aroma associated with roasted cacao nibs |
| Total Fruit | Canned mixed fruit (Dole) | Aroma associated with fruity characteristics |
| Blueberry | Dried blueberries | Aroma associated with blueberries |
| Grape | Grape juice (Welch's) | Aroma associated with grape juice |
| Roasty | Roasted coffee beans | Aroma associated with roasted foods |
| Nutty | Almonds | Aroma associated with nuts |
| Caramelized | Brown sugar | Aroma associated with brown sugar |

TABLE 19B

Four basic tastes.

| Taste | References | Definitions |
|---|---|---|
| Sour | 0.4% citric acid solution | Taste associated with citric acid solution |
| Bitter | 0.02% caffeine solution | Taste associated with caffeine solution |
| Sweet | 6% sucrose solution | Taste associated with sucrose solution |
| Salty | 0.5% NaCl solution | Taste associated with salt solution |

TABLE 19C

Mouthfeel.

| Mouthfeel | References | Definitions |
|---|---|---|
| Astringency | 0.4% Alum solution | Puckering/drying mouthfeel |

For the sensory evaluation, the panelists were asked to taste each chocolate and asked to score each flavor attribute on a nine-point scale from 0 to 4, in which 0=not observable, 1=weak intensity, 2=moderate intensity, 3=strong intensity, and 4=extreme intensity (in 0.5 increments). First, the control chocolate was evaluated and scored for all twelve flavor attributes. Then, each test chocolate was evaluated, and the panelists were asked to score the test chocolate's flavor attributes in relation to the intensity of the same flavor attribute in the control chocolate. For palate cleansing, breaks were taken in between each flavor evaluation. The sensory experiment was conducted in triplicate. The scores for each attribute (5 samples; 12 attributes; 6 panelists in triplicate (18 observations per attribute); 1080 total observations) were compiled. The mean (M) and the standard error of the mean (SEM) were calculated using Microsoft® Excel Version 16.21 for Office 360 (Microsoft Corporation, Redman, Wash.). To compare the intensity of each chocolate flavor attribute, the mean rating of each attribute was evaluated using a one-way analysis of variance (ANOVA). If ANOVA proved to be significant, means were separated with Tukey-Kramer HSD test. All statistical analyses was performed using JMP Pro 14.0.0 software (SAS Institute, Cary, N.C.) with a significance level of $\alpha=0.05$. Graphs were prepared using GraphPad Prism version 9.0.0 for Windows (GraphPad Software, San Diego, Calif.).

Results

Figure 4D:
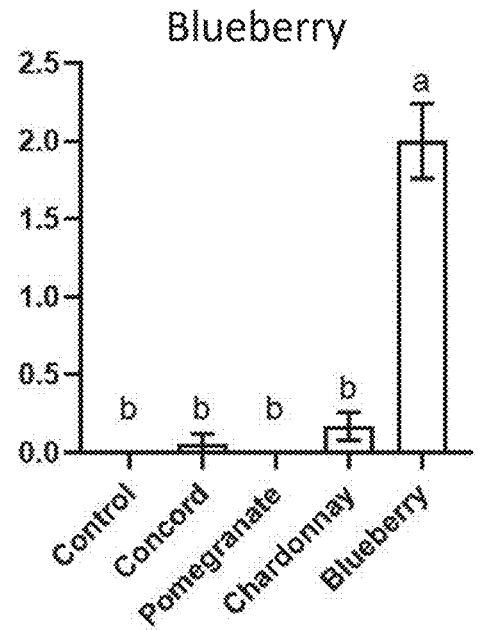
Figure 4C:
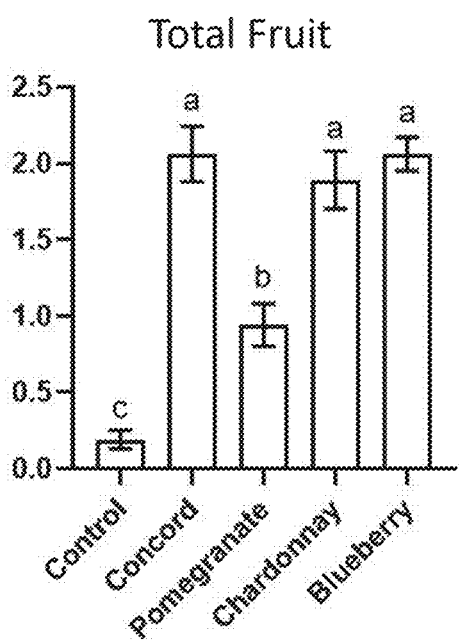
Figure 4E:
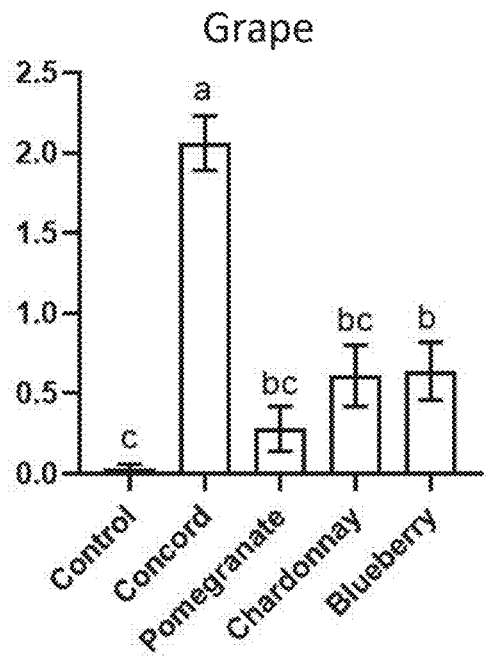
Figure 4F:
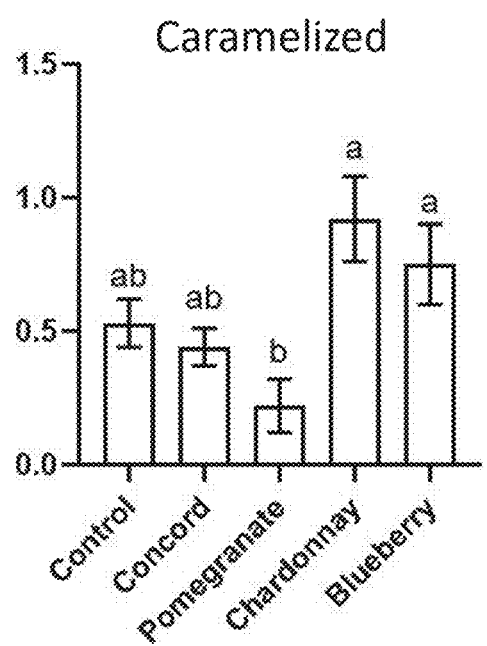
Figure 4H:
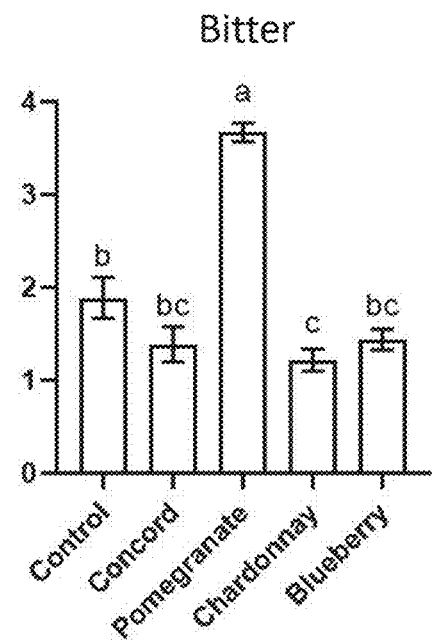
Figure 4G:
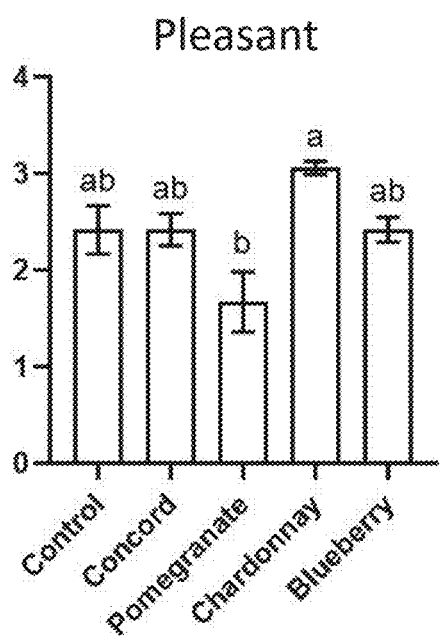
Figure 4I:
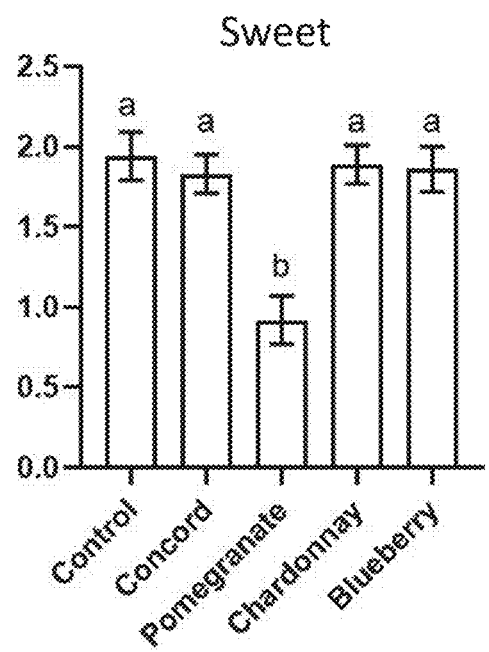
Figure 4J:
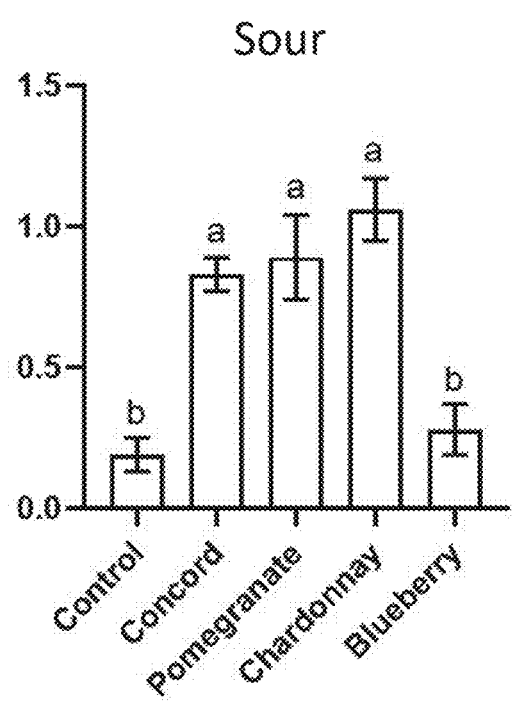

The flavor and aroma attributes of the chocolates that were significantly different are shown in FIGS. 4B-4J. All of the marcs significantly decreased cocoa aroma attributes (FIG. 4B) and increased total fruit aroma attributes (FIG. 4C) of the chocolate compared to the control. As expected, only the blueberry marc led to a significant increase in detection of blueberry aroma attributes (FIG. 4D). Interestingly, Concord and blueberry marcs both led to a significant increase in grape aroma attributes compared to the control chocolate, while the Chardonnay marc did not (FIG. 4E). This demonstrates a surprising effectiveness of Chardonnay marc in increasing the overall fruitiness of chocolate without adding a distinct grape flavor. Chocolates with Chardonnay and blueberry marcs had a slight, but not significant, increase in caramelized attributes compared to the control chocolate (FIG. 4F). All of the marcs except blueberry led to a significant increase in sour taste attributes compared to the control chocolate (FIG. 4J). No statistically significant differences were observed in the roasty, nutty, and salty attributes of the chocolates.

Grape, blueberry, and pomegranate products are all desired by consumers for their high concentrations of antioxidant flavanols and other polyphenols. As discussed in Example 7, one would expect that addition of marcs of these high-flavanol fruits would increase the unpleasant astringent mouthfeel and bitterness of chocolate. Surprisingly, none of the marcs led to a significant decrease in pleasant mouthfeel compared to the control (FIG. 4G), and only pomegranate marc led to a significant increase in bitterness (FIG. 4H) and a significant decrease in sweetness (FIG. 4I), despite an ~25% reduction in sugar content (Table 18B). These results demonstrate that the unexpected effect of delivering desired dietary flavanols to chocolate while maintaining sweetness and pleasant mouthfeel without increasing bitterness is not unique to Chardonnay marc, and may be achieved with other grape and berry marcs. Notably, only Chardonnay marc led to a significant decrease in bitterness (FIG. 4H) while maintaining pleasant mouthfeel (FIG. 4G) and sweetness (FIG. 4H), highlighting its particular effectiveness.

What is claimed is:

1. A food composition, comprising:
    chocolate; and
    milled agricultural marc, wherein the agricultural marc is a byproduct of fruit juicing or fruit processing, and wherein the agricultural marc comprises at least two of seeds, skins, and pulp,
    wherein (i) the milled agricultural marc is present in an amount of between 1% and 50% by weight of the total food composition; or (ii) the weight ratio of chocolate to marc is between 1:1 and 100:1, or both, and
    wherein the milled agricultural marc is milled grape marc, milled cranberry marc, milled blueberry marc, milled blackberry marc, milled raspberry marc, milled mulberry marc, milled huckleberry marc, milled chokeberry marc, milled elderberry marc, milled gooseberry marc, milled lingonberry marc, milled boysenberry marc, milled red currant marc, milled black currant marc, milled acai berry marc, milled goji berry marc, milled cape gooseberry marc, or milled pomegranates marc, or any combination thereof.

2. The composition of claim 1, wherein (i) the milled agricultural marc is present in an amount of between 5% and 30% by weight of the total composition; or (ii) the weight ratio of chocolate to marc is between 2:1 and 20:1 by weight, or both.

3. The composition of claim 1, wherein the composition comprises cocoa butter.

4. The composition of claim 3, wherein the composition has a cocoa butter content in an amount between 0.5% and 40% by weight of the total composition.

5. The composition of claim 3, wherein the composition has a cocoa butter content in an amount between 10% and 30% by weight of the total composition.

6. The composition of claim 3, wherein the ratio of cocoa butter to marc is at least 1:2.

7. The composition of claim 1, wherein the food composition has total fruit aromatic attributes at a rating of at least 0.5 or higher on a scale of 0 to 4.

8. The composition of claim 1, wherein the food composition has bitter taste attributes at a rating of 2.5 or lower on a scale of 0 to 4.

9. The composition of claim 1, wherein the food composition has pleasant mouthfeel attributes at a rating of at least 1.0 or higher on a scale of 0 to 4.

10. The composition of claim 1, wherein the food composition has sweet taste attributes at a rating of at least 1.0 or higher on a scale of 0 to 4.

11. The composition of claim 1, wherein the composition has astringency flavor notes at a rating of 5.0 or lower on a scale of 0 to 15.

12. The composition of claim 1, wherein the composition has bitter flavor notes at a rating of 2.5 or lower on a scale of 0 to 15.

13. The composition of claim 1, wherein the composition has sweet flavor notes at a rating of between 6.0 and 10.0 on a scale of 0 to 15.

14. The composition of claim 1, wherein the composition has a sugar content of less than 25% by weight.

15. The composition of claim 1, wherein the composition has a fiber content of at least 5% by weight of the total composition.

16. The composition of claim 1, further comprising salt, or intense sweetener, or a combination thereof.

17. The composition of claim 1, wherein the milled agricultural marc is milled grape marc.

18. The composition of claim 1, wherein the milled agricultural marc is milled white grape marc.

19. The composition of claim 18, wherein the milled white grape marc comprises milled Chardonnay marc.

20. The composition of claim 19, wherein the food composition has grape aromatic attributes at a rating of 1.0 or lower on a scale of 0 to 4.

21. The composition of claim 18, wherein the food composition has grape aromatic attributes at a rating of at least 1.0 or higher on a scale of 0 to 4.

22. The composition of claim 1, wherein the milled agricultural marc is in powder form having an average particle size of less than or equal to 100 microns.

23. The composition of claim 1, wherein the composition comprises a total amount of DP1-DP7 cocoa flavanols and procyanidins of at least about 10 mg per 30 g serving of the chocolate composition.

24. The composition of claim 1, wherein the composition comprises a total amount of DP1-DP7 cocoa flavanols and procyanidins of at least about 1 mg/g of the chocolate composition after defatting.

25. The composition of claim 1, wherein the milled agricultural marc is milled red grape marc.

26. The composition of claim 1, wherein the milled agricultural marc is milled Concord grape marc.

27. The composition of claim 1, wherein the milled agricultural marc is milled blueberry marc.

28. The composition of claim 1, wherein the milled agricultural marc is milled pomegranate marc.

29. The composition of claim 1, wherein:
the milled agricultural marc is present in an amount of between 5% and 30% by weight of the total composition, or (ii) the weight ratio of chocolate to marc is between 2:1 and 20:1 by weight, or both (i) and (ii);
the milled agricultural marc has an average particle size of about 10 to about 50 microns; and
the composition has: (a) a sugar content of less than 25% by weight, (b) a fiber content of at least 5% by weight of the total composition, (c) decreased bitter taste attributes compared to a control chocolate composition lacking agricultural marc; and (d) similar sweet taste attributes compared to a control chocolate composition lacking Chardonnay marc.

30. The composition of claim 29, wherein the milled agricultural marc is milled grape marc, milled blueberry marc, or milled pomegranate marc.

31. The composition of claim 29, wherein the milled agricultural marc is milled Chardonnay marc.

32. The composition of claim 1, wherein the agricultural marc has undergone extraction, crushing, grinding, homogenization, passage through a screen or sieve, centrifugation, micronization, pulverization, rinsing, drying, or any combination thereof before or after milling.

* * * * *